(12) United States Patent
Phallen et al.

(10) Patent No.: US 7,357,563 B2
(45) Date of Patent: Apr. 15, 2008

(54) CONTINUOUS LIQUID STREAM BLENDER

(75) Inventors: Iver Phallen, Youngstown, NY (US); David Messing, Wilson, NY (US); Robert Comfort, West Seneca, NY (US)

(73) Assignee: Oden Corporation, Tonawanda, NY (US)

( * ) Notice: Subject to any disclaimer, the term of this patent is extended or adjusted under 35 U.S.C. 154(b) by 522 days.

(21) Appl. No.: 11/125,807

(22) Filed: May 9, 2005

(65) Prior Publication Data

US 2005/0270899 A1    Dec. 8, 2005

Related U.S. Application Data

(60) Provisional application No. 60/568,932, filed on May 7, 2004.

(51) Int. Cl.
*B01F 3/08* (2006.01)
(52) U.S. Cl. .................. 366/132; 366/134; 366/179.1; 366/181.5
(58) Field of Classification Search ............... 366/132, 366/134, 179.1, 181.4
See application file for complete search history.

(56) References Cited

U.S. PATENT DOCUMENTS

| 4,341,327 | A  | * | 7/1982  | Zeitz ........................... 222/63 |
| 4,427,298 | A  | * | 1/1984  | Fahy et al. ................. 366/132 |
| 5,996,650 | A  |   | 12/1999 | Phallen et al. |
| 6,186,193 | B1 |   | 2/2001  | Phallen et al. |
| 6,675,988 | B2 | * | 1/2004  | Cline et al. .................... 222/55 |
| 6,824,012 | B2 | * | 11/2004 | Werner .......................... 222/1 |

\* cited by examiner

*Primary Examiner*—David Sorkin
(74) *Attorney, Agent, or Firm*—John C. Thompson

(57) ABSTRACT

Continuous stream ratio blending of two or more liquids. Each stream flow is time synchronized to all others and turned on and off to dose precise ratios into a constant pressure streams combining chamber. Combined on-off flows constitute a net flow rate exceeding some maximum continuous flow demand for the blended liquids. Dosed streams are pumped from the streams combining chamber at a rate matching their inflow, then through a mixing element into a finished blend tank. Use of a constant pressure streams combining chamber feeding a mix pump allows decoupling of individual streams ratio dosing flows and pressures one from another and from the combined stream. Blended liquid is available on demand as a continuous stream from the level controlled finished blend tank. The level sensor automatically starts and stops blended flow into the tank. Streams flow can be stopped upon completion of any dose cycle.

18 Claims, 15 Drawing Sheets

A DIAGRAMATIC VIEW OF A PREFERED EMBODIMENT OF THE IMPROVED CONTINUOUS OUTFLOW STREAM LIQUIDS BLENDING SYSTEM

A DIAGRAMATIC VIEW OF THE IMPROVED
CONTINUOS OUTFLOW STREAM LIQUIDS
BLENDING SYSTEM SHOWING ONE MIXING ELEMENT
ON THE SUCTION SIDE OF THE MIX PUMP

A DIAGRAMATIC VIEW OF A PREFERED EMBODIMENT OF THE IMPROVED CONTINUOUS OUTFLOW STREAM LIQUIDS BLENDING SYSTEM SHOWING STEPPED REDUCTION IN THE LAMINER FLOW STREAMS COMBINING LOCATIONS

A DIAGRAMATIC VIEW OF A PREFERED EMBODIMENT OF THE IMPROVED CONTINUOUS OUTFLOW STREAM LIQUIDS BLENDING SYSTEM SHOWING THE APPARATUS DOSING BLENDED LIQUID DIRECTLY INTO A UNIT OF USE CONTAINER

A DIAGRAMATIC VIEW OF A FINISHED
BLEND TANK SHOWING TYPICAL
VOLUMETRIC PARTITIONING

A DIAGRAMATIC VIEW OF A PREFERED EMBODIMENT OF THE IMPROVED CONTINUOUS OUTFLOW STREAM LIQUIDS BLENDING SYSTEM SHOWING USE OF INDEPENDENTLY CONTROLLED PERFORMANCE VERIFICATION CORIOLIS MASS FLOW METERS LOCATED AT EACH DOSE STREAM AND AFTER ALL MIXING ELEMENTS

A DIAGRAMATIC VIEW OF AN EMBODIMENT OF THE IMPROVED CONTINUOUS OUTFLOW STREAM LIQUIDS BLENDING SYSTEM SHOWING A PRESSURE CONTROL DESIGN FOR CONTROLLING STREAMS COMBINING CHAMBER LIQUID LEVEL

A DIAGRAMATIC VIEW OF THE IMPROVED CONTINUOS OUTFLOW STREAM LIQUIDS BLENDING SYSTEM SHOWING THE ABILITY TO ADD SOLIDS AS A COMPONENT STREAM DURING STREAMS RATIO DOSING (AUGER FILLER SHOWN, LOSS IN WEIGHT FEEDER ALSO CLAIMED)

A POSITIVE SHUT-OFF LIQUID FILLING AND DOSING
NOZZLE AS AN EXAMPLE OF KNOWN PRIOR ART
FIG. 14a
FIG. 14b
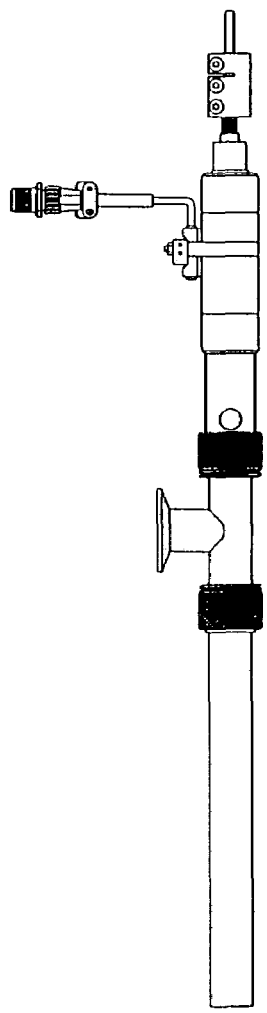
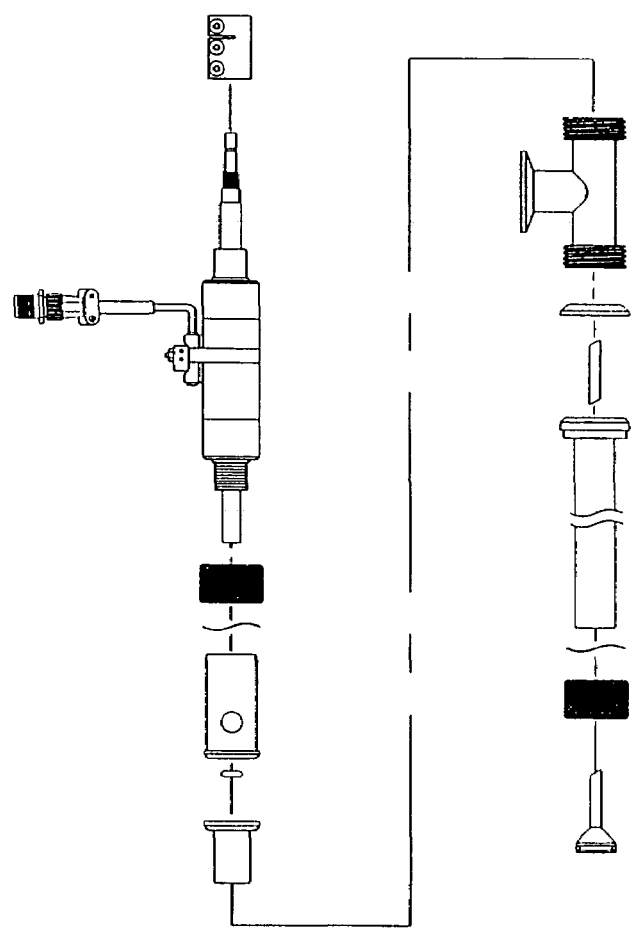

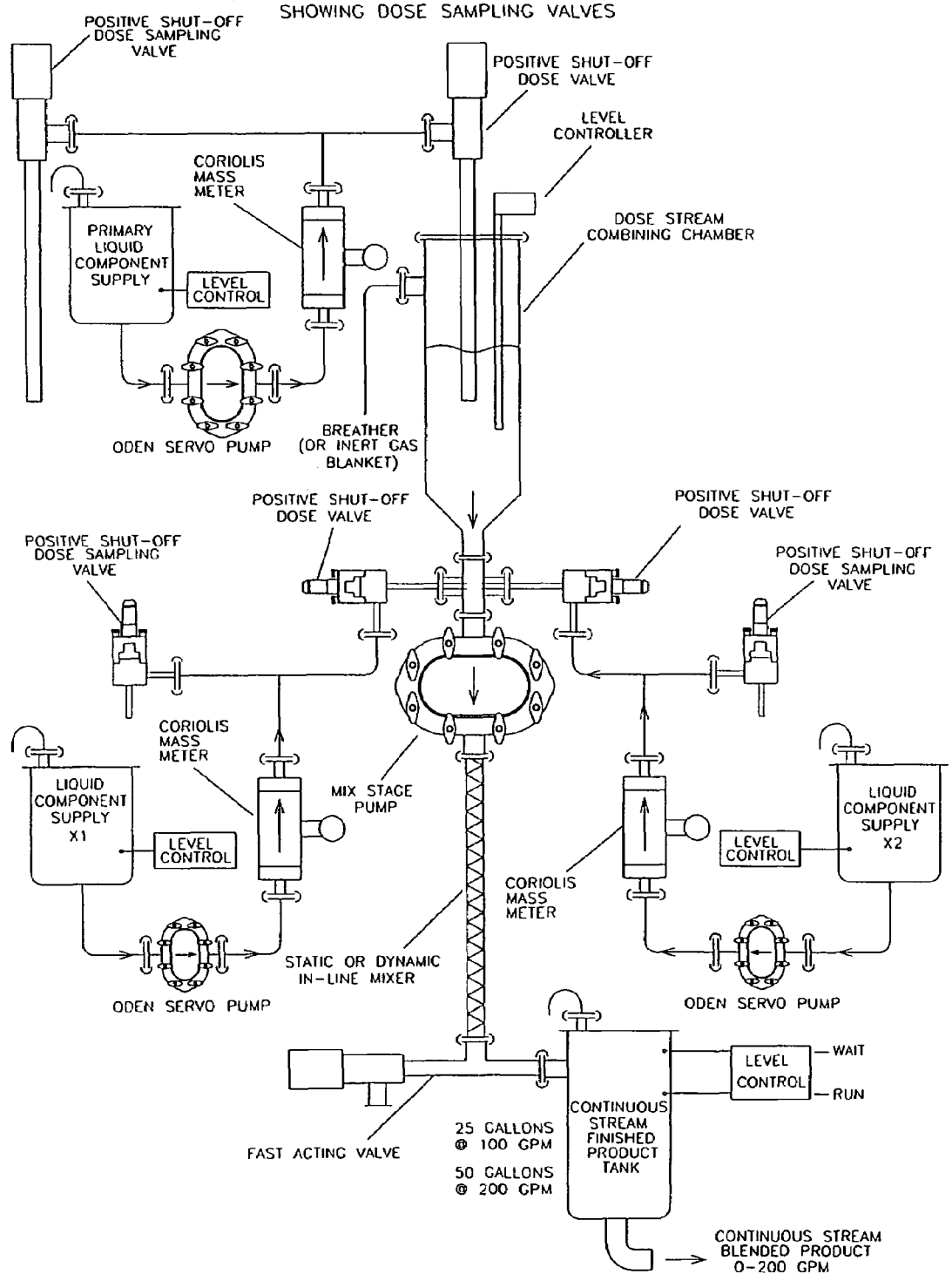

CONTINUOUS LIQUID STREAM BLENDER

CROSS-REFERENCE TO RELATED APPLICATIONS

This application claims priority from U.S. provisional application Ser. No. 60/568,932 filed May 7, 2004.

TECHNICAL FIELD

The present invention relates generally to a method and apparatus for the combining together of two or more liquids to form a batch or blend of desired mixture ratio or proportions. More specifically, the invention relates to the use of intermittently operated servo driven pumps, flow meters, and precise fast-acting flow shut-off devices to create repeated time synchronized ratio defined doses of two or more liquids flowing into a common constant pressure streams combining chamber. The synchronized intermittent doses are synchronously removed from the combining chamber at a flow rate matching the summed flow rate of the doses flowing into the chamber and are then displaced through a mixing element. The mixed streams are then received by a final blend tank of desired capacity where the blended liquids are available for use on a continuous stream or flow basis, at a rate up to a defined maximum. The entire apparatus may be started at will and stopped at the completion of any given time synchronized dose cycle. Within the scope of the invention, provision is also made for the combining of one or more solids with one or more liquids.

Because of the novel separation of streams ratio dose combining pressures from the pressures required to effect streams mixing, a substantially broader range of liquids and formulas can be blended on a given apparatus of the present invention. Thus, manufacturing agility and versatility are enhanced by this new invention.

BACKGROUND OF THE INVENTION

The combining of two or more liquids together to form a defined mixture of the constituent liquids is fundamental to many industrial processes and commercial products. This combining of liquids may be referred to as batching or blending and is common to many industrial segments including pharmaceutical products, biomedical products, food processing products, household products, personal care products, petroleum products, chemical products, and many other general industrial, commercial, and consumer liquid products.

Most typically, liquid products are made by combining relatively large quantities of each constituent. Constituent liquids are held in large tanks and are moved in correct volumetric or weight ratio into another large tank where mixing of the liquids occurs. This general process is referred to as batching.

The many drawbacks and limitations of liquids batching are well detailed and discussed in U.S. Pat. No. 6,186,193 B1, column 1, line 47, to column 2, line 7. These discussions are thus incorporated into this specification by reference.

Because of the numerous and substantial shortcomings and limitations of liquid products batch processing, alternative means of liquid products manufacturing have been sought. One alternative method to batching is termed continuous steam blending.

Continuous stream blending embodies the notion of combining constituent liquids to form a liquid product only as needed or on a demand basis. Essentially, product is made only as required and at the flow rate required. The flow rate required is typically based on the demand of the liquid filling machine packaging the liquid product.

The appeal and merit of a continuous stream blending system, as distinct from a batching system, is clear. The ability to eliminate large liquid product batch preparation and holding tanks leads to a small system volume, more product compounding flexibility, faster product species turnaround, smaller and shorter practical packaging run capabilities, and a substantially lower capital asset commitment. Continuous stream blending can also yield superior product formula accuracy and quality, and can eliminate the barrier or "wall" between liquid products processing and liquid products packaging, as well as greatly reduce waste, cleanup time, and effluent volumes. Furthermore, mixing is simplified and product aging effects are largely eliminated. The real issue is how to build a continuous stream blending system with the maximum degree of accuracy, flexibility of use, and versatility of application in a broad range of commercial sectors.

DISCUSSION OF THE PRIOR ART

The numerous designs for continuous stream blending that have been previously disclosed in the commercial and patent art are set forth in substantial detail in U.S. Pat. No. 6,186,193 B1 at column 2, line 36, to column 4, line 16. The problems and limitations of these designs are also therein reviewed. This section of U.S. Pat. No. 6,186,193 B1 is thus incorporated into the present specification by reference.

The prior art also includes U.S. Pat. No. 6,186,193 B1, in which Phallen et al disclose an invention consisting "of a method and apparatus providing for the continuous stream blending, preferably on a mass ratio basis, of two or more liquids. Each individual liquid stream is synchronously dosed in precise mass ratio to a common mixing point. The flow of each stream is on-off or digital. Repeated mass ratio doses of defined and matching flow interval, referred to as synchronous digital flow, interspersed with a defined interval of no flow, constitutes digital flow at a net rate sufficient to meet or exceed some required take-away of the blended liquids. In one preferred embodiment, each dose stream flow is produced and measured by an apparatus preferably consisting of a device for initiating liquid flow in the form of a controller and a precision positive displacement pump, the apparatus further including Coriolis mass meter and a precision flow stream shut-off device. The servo motor and controller establish and control a periodic and intermittent flow rate necessary to displace a defined mass dose in a precisely defined flow interval. The flow interval is measured against a precision millisecond digital clock. The Coriolis mass meter is used only to totalize mass flow to define the desired mass dose during the defined digital flow interval. The flow stream shut-off device ensures precise delivery of the mass dose to the common mixing point. The flow rate of a stream is automatically adjusted by the control electronics until the required mass dose is delivered in the defined flow interval" (column 7, line 41 to line 67).

"Because each flow stream starts and stops simultaneously regardless of the mass dose associated with each stream, blending or mixing of the streams at a common intersection to a defined mass ratio formula is facilitated by the simultaneous and kinetic collision and resultant mixing of the coincident flows in a mixing chamber. The blending apparatus can be started at will and can be stopped at the end of each defined dose interval, typically every 5000 mS. This method allows the apparatus to be operated in liquids process environments where frequent stop and start conditions are prevalent, without any penalty or error in mass ratio accuracy or blending efficacy. Use of PLC or PC system control in conjunction with a precision millisecond (1000 Hz) clock signal allows automatic establishment of mass dose and flow stream synchronization at start up, as well as self-checking and correction of mass dose and flow synchrony with each digital flow cycle. Operation is preferably based upon a mass ratio recipe or formula, although the control software also provides for conversion of volumetric formulas to mass. The apparatus automatically adapts to changes in take-away flow rate by varying the off time or no flow interval between synchronous digital doses, thus eliminating manual or electronic adjustment or recalibration of the liquid flow streams as take-away demand varies" (column 8, line 1 to line 24).

In U.S. Pat. No. 6,186,193 B1, Phallen teaches a continuous stream blending design in which primary streams mixing occurs by hydraulically combining the streams in a kinetic mixing chamber, with secondary streams mixing occurring by hydraulic flow and displacement of the streams from the kinetic mixing chamber through a second mixing device which is, in turn, hydraulically connected to a finished blend tank.

In Phallen's invention, the motive force to move the liquids into and through the kinetic mixing chamber and through a mixing device and onward into the finished blend tank, is derived solely from the streams ratio dosing pumps. Essentially, the combined pumped flow from all of the stream pumps supplies all of the energy to move the liquid streams to and through the combining and blending portions of the apparatus and, after streams combining, on through the connecting conduit into the terminus of the system represented by the finished blend tank. In the Phallen design there is no other or additional pump or other motive force inducing liquid flow through the apparatus.

The hydraulic nature of the Phallen patent is clear. As a hydraulic design, the entire fluid flow pathway, from the bulk supply source tank of each stream to the finished blend tank, is charged with the liquids being combined. There are no intentional gas voids or other breaks in the fluid flow pathway in any part of the system.

Although the design taught by Phallen represents an advancement in the state-of-the-art and has had commercial success, limitations and constraints have emerged.

Among the limitations of the U.S. Pat. No. 6,186,193 B1 invention, the most evident center on the completely hydraulic design of the fluid flow pathway of the apparatus. Because of the hydraulic design, streams flow rates are influenced by changing back pressures, which are, in turn, fundamentally influenced by varying viscosities, rheologies, temperatures, and so forth.

Because the system is hydraulic, every variation or disturbance or change in operating conditions is evident in every other part of the system. Each and every part of the system fluid flow pathway is hydraulically connected, one to the other. Thus, a change in flow on any stream represents an essentially instantaneous change in the flow resistance or back pressure acting on every other flow stream. In effect, every stream is "visible" to every other stream. Thus, each manual or automatic performance adjustment on a given stream acts upon and alters the conditions of flow on the remaining streams. Moreover, the performance change on a given stream is directly contradictory to the setpoint requirements of the other flow streams. Thus, a reduced flow on one stream lowers the overall system hydraulic pressure. This pressure decrease tends to increase dose ratio flow on the remaining flow streams, which then forces a flow rate adjustment to be made on these streams. Conversely, an increased flow on one stream increases the overall system hydraulic pressure. This pressure increase tends to lower dose ratio flow on the remaining flow streams, which then forces a flow rate adjustment to be made on these streams.

In U.S. Pat. No. 6,186,193 B1, Phallen also teaches a design which provides for the ability to sample each stream by direct ratio dose collection to atmosphere at the point of hydraulic combining of each stream into the kinetic mixing chamber. The purpose of this sampling capability is twofold. First, it provides the means to empirically compare an actual dose mass with the dose mass displayed by the Coriolis mass flow meter, thus proofing the meter and its scaling and calibration. The second purpose of this sampling capability is to provide means to directly measure and verify each dose ratio as delivered into the kinetic mixing chamber. However, with the system in operation, pressure in the kinetic mixing chamber is substantially above atmosphere. This is particularly true with higher viscosity liquids. Because this is true, the sample ratio dose delivered to atmosphere often will not correspond closely to the ratio dose delivered at the higher kinetic mixing chamber pressure when the stream flow rate and delivery time for each condition are held constant. Thus a significant flow rate adjustment must be made for correct dose flow into the kinetic mixing chamber, and direct empirical sampling is not possible.

Another limitation of the Phallen invention is a direct consequence of the hydraulic design. Because the streams pumps supply the flow energy to propel each liquid stream through the system all the way to the finished blend tank, the back pressure on the overall system and upon each stream is determined by the flow structure of the system, principally distal to the streams pumps. The flow structure most prominent in determining this back pressure is the mixing element downstream from the kinetic mixing chamber. In most instances, this mixing element consists of a static mixing device. These types of mixing devices, by their nature, impose a substantial flow restriction and, thus, create a high back pressure. This is particularly true with higher viscosity liquids. Because the stream pumps are the only means of creating flow through the mixing structures of the design, a high or elevated back pressure environment is imposed upon each stream ratio dosing pump. This condition is unfavorable to best ratio dosing accuracy, stability, and repeatability of the ratio dosing pumps. Further, induced back pressures are difficult to predict as a function of changing liquid formulas and constituent liquid components and of changing flow rates and conditions. Changing requirements or conditions relative to liquid viscosities are of particular concern in predicting and controlling system operating pressures.

Another negative aspect of the fluid flow pathway of the Phallen invention is that if additional mixing capability must be added to achieve streams mixing efficacy with a particular liquid formula, back pressures will be substantially increased on all parts of the system, including the streams ratio dosing pumps. This problem can be particularly severe where high viscosity liquids are generally harder to mix together and require more mixing elements for thorough combining. This, in turn, causes a dramatic increase in flow resistance and back pressure acting on the streams ratio dosing pumps.

OBJECTS AND SUMMARY OF THE INVENTION

It is a primary object of the present invention to set forth an Improved Continuous Liquid Stream Blending System which overcomes the numerous disadvantages, as set forth above, of presently known continuous liquid stream blending methods and prior art.

More particularly, the primary objects of the present invention include:

1. To disclose a unique and novel continuous outflow stream liquids blending method and apparatus wherein the liquid flow through the apparatus is subdivided into three sequential parts or stages or zones; a first part including two or more streams ratio dosing subassemblies, a second part including a streams combining and mixing subassembly; and a third part being a finished blended product tank.
2. To disclose a unique and novel continuous outflow stream liquids blending method and apparatus wherein the separation of ratio dosing flows apart from combining and mixing flows allows absolute separation of ratio dosing pressures from mixing pressures, such that one cannot act upon or alter the other.
3. To disclose a unique and novel continuous outflow stream liquids blending method and apparatus wherein the ratio dosing flow from each stream is into a streams combining chamber and in which the combining chamber is maintained at a constant pressure.
4. To disclose a unique and novel continuous outflow stream liquids blending method and apparatus wherein the constant pressure of the streams combining chamber is common to and essentially the same for each of the ratio dosing streams flowing into the chamber.
5. To disclose a unique and novel continuous outflow stream liquids blending method and apparatus wherein the flow from any one stream or any combination of streams into the streams combining chamber does not alter or influence the pressure in the combining chamber.
6. To disclose a unique and novel continuous outflow stream liquids blending method and apparatus wherein the flow rate of any one stream into the combining chamber is essentially unaffected by the flow rates of any other stream or combination of streams flowing into the combining chamber.
7. To disclose a unique and novel continuous outflow stream liquids blending method and apparatus wherein the size or amount of the ratio dose of any one stream flowing into the combining chamber is essentially unaffected by the size or amount of the ratio dose of any other stream or combination of streams flowing into the combining chamber.
8. To disclose a unique and novel continuous outflow stream liquids blending method and apparatus wherein any ratio dose stream apparatus producing flow into the streams combining chamber can be scaled and configured as required to deliver the requisite ratio dose at the requisite flow rate into the combining chamber without any influence upon the necessary scaling and configuration of any other ratio dose stream apparatus producing flow into the same combining chamber.
9. To disclose a unique and novel continuous outflow stream liquids blending method and apparatus wherein the pressure acting on the dose streams combining chamber is atmospheric pressure.
10. To disclose a unique and novel continuous outflow stream liquids blending method and apparatus wherein the pressure acting on the dose streams combining chamber can be at a specified and controlled and maintained pressure above atmospheric pressure.
11. To disclose a unique and novel continuous outflow stream liquids blending method and apparatus in which liquid flow through the streams combining chamber is only from a mixing or mix stage pump acting on the outfeed of the chamber, and not from the flows of the ratio dose streams.
12. To disclose a unique and novel continuous outflow stream liquids blending method and apparatus wherein the mix stage pump can be sized and scaled and configured as required to provide the necessary combined streams flow from the streams combining chamber and into the mixing elements and the finished blend tank without any influence upon the scaling and configuration of any ratio dose stream apparatus.
13. To disclose a unique and novel continuous outflow stream liquids blending method and apparatus wherein the sizing and scaling and configuration of the mix stage pump is independent from any aspect of the scaling and sizing and configuration of any ratio dose stream apparatus.
14. To disclose a unique and novel continuous outflow stream liquids blending method and apparatus wherein one or more first stage streams mixing elements or apparatus can be located between the suction side of the mixing pump and the outfeed of the streams mixing chamber.
15. To disclose a unique and novel continuous outflow stream liquids blending method and apparatus in which one or more second stage principle streams mixing elements or apparatus are located on the discharge side of the mix stage pump.
16. To disclose a unique and novel continuous outflow stream liquids blending method and apparatus wherein the nature and configuration of any mixing elements or apparatus associated with the combining chamber or mix stage pump has no effect upon the flow rate or size or amount of any ratio dose stream flowing into the combining chamber.
17. To disclose a unique and novel continuous outflow stream liquids blending method and apparatus wherein the summed flow rate of the ratio dosing streams entering into the combining chamber is substantially equivalent to and synchronous with the flow rate of the combined streams exiting from the combining chamber.
18. To disclose a unique and novel continuous outflow stream liquids blending method and apparatus wherein a mix stage pump is operated to establish a flow from the streams combining chamber and into the streams mixing elements which is substantially synchronous with and equivalent to the combined flow rates of the ratio dose streams entering into the streams combining chamber.
19. To disclose a unique and novel continuous outflow stream liquids blending method and apparatus wherein flow through the streams mixing elements is caused by and controlled by the mixing pump only and not by any streams ratio dose flows.
20. To disclose a unique and novel continuous outflow stream liquids blending method and apparatus wherein the highest flow stream is ratio dosed into the largest diameter section of a cylindrical shaped streams combining chamber while lower flow streams are ratio dosed into a smaller diameter cylindrical shaped section of the combining chamber, which is located at the discharge end of the chamber and relatively adjacent to the suction port of the mix stage pump.
21. To disclose a unique and novel continuous outflow stream liquids blending method and apparatus wherein the streams ratio doses are combined at ratio matched flows in a reduced diameter laminar flow section of the streams combining chamber.

22. To disclose a unique and novel continuous outflow stream liquids blending method and apparatus wherein rate of flow of streams entering the streams combining chamber is matched to the rate of flow of the combined streams leaving the streams combining chamber by maintaining the liquid in the streams combining chamber at relatively constant level.
23. To disclose a unique and novel continuous outflow stream liquids blending method and apparatus wherein the liquid level in the streams combining chamber is measured by use of one or more liquid level sensors.
24. To disclose a unique and novel continuous outflow stream liquids blending method and apparatus wherein the streams combining chamber liquid level sensor is used to control the flow rate of the streams mixing pump, thereby controlling and maintaining the liquid level of the streams combining chamber at a relatively constant setpoint.
25. To disclose a unique and novel continuous outflow stream liquids blending method and apparatus wherein any non-synchronous ratio dose flow between streams upon the start of or the completion of a synchronous flow ratio dose flow event is minimized or eliminated by matching the acceleration rates and deceleration rates of the streams ratio dosing pumps.
26. To disclose a unique and novel continuous outflow stream liquids blending method and apparatus wherein any non-synchronous ratio dose flow caused by one stream beginning actual dose flow earlier in the common fixed dose time than other streams is minimized or eliminated by delaying the start of flow of that stream and then delivering the requisite total ratio dose in the remaining available common dose time.
27. To disclose a unique and novel continuous outflow stream liquids blending method and apparatus wherein a mathematical technique termed herein as formula inflation can allow resizing of streams ratio dose flow rates, if necessary, to better fit within the available flow meter operating flow rate parameters.
28. To disclose a unique and novel continuous outflow stream liquids blending method and apparatus wherein a fast-acting positive shut-off valve is generally located distal to the last mixing element and before the finished blend tank; the valve being closed when there is no flow through the apparatus and thus serving to prevent flow from the streams combining chamber and all portions of the apparatus downstream from the combining chamber to the valve.
29. To disclose a unique and novel continuous outflow stream liquids blending method and apparatus wherein the flow of the ratio defined and synchronized streams through the mix stage pump contributes to the streams combining and mixing due to the mixing action of the pump.
30. To disclose a unique and novel continuous outflow stream liquids blending method and apparatus wherein priming of the system fluid flow pathway with liquids is accomplished by monitoring the level of the streams combining chamber as each stream flow pathway is charged, beginning with the largest ratio fraction stream.
31. To disclose a unique and novel continuous outflow stream liquids blending method and apparatus wherein the operation of the streams ratio dosing portion of the apparatus is functionally linked to the streams combining and mixing portion of the apparatus by only a single control signal, which serves to synchronize and match streams ratio dosing flow with streams combining and mixing flow.
32. To disclose a unique and novel continuous outflow stream liquids blending method and apparatus wherein streams combining chamber level control can be implemented by first establishing a defined gas pressure in the chamber between flow cycles, then sealing the chamber prior to a synchronous streams ratio dose flow cycle, then measuring the chamber pressure during streams flow using a pressure sensor and using the pressure sensor measurement to give feedback loop control of the mix stage pump in order to hold the chamber pressure and thus level nearly constant such that falling pressure increases mix pump flow and increasing pressure reduces mix pump flow.
33. To disclose a unique and novel continuous outflow stream liquids blending method and apparatus wherein numerous methods and apparatus are disclosed for validating the performance of the liquids blending invention, and for continuously verifying the performance of the invention, and for safeguarding against undetected malfunctions of the constituent devices comprising the invention.

BRIEF DESCRIPTION OF THE FIGURES

FIGS. 14a and 14b are views of a positive shut-off liquid filling and dosing nozzle as an example of known prior art.

FIG. 15 is a diagrammatic view of a preferred embodiment of the improved continuous outflow stream liquids blending system showing dose sampling valves.

DETAILED DESCRIPTION

Figure 1:
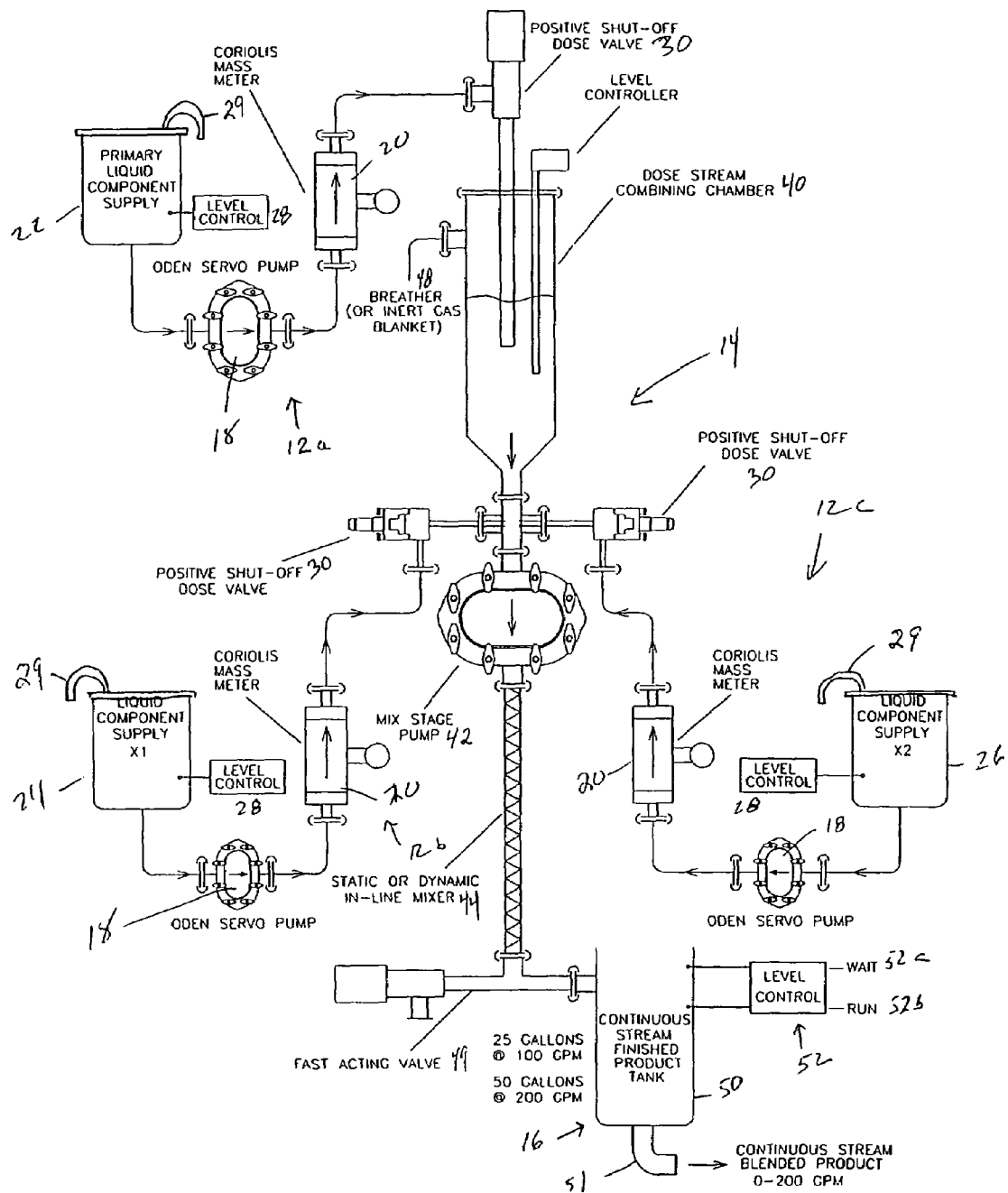
FIG. 1 is a diagrammatic view of a preferred embodiment of the improved continuous outflow stream liquids blending system.

By definition, a continuous stream blending system, which is indicated generally at 10 in various FIGS., must make fully mixed or blended liquid product available at its output at a makeup rate equal to take-away demand. The take-away demand rate is generally defined by the running speed of the liquid product packaging line being serviced by the continuous stream blending system. The system 10 includes a first streams ratio dosing subassembly, a second stage streams combining and mixing subassembly; and a third finished blended product tank. The first streams ratio dosing subassemblies or digital stream ratio channels or subassemblies are indicated 12, there being one for each liquid component supply. Thus, in FIG. 1, three streams ratio dosing subassemblies are illustrated, subassembly 12a being for a primary liquid component, subassembly 12b being for a first liquid component to be added, and subassembly 12c being for a second liquid component. The second stage streams combining and mixing subassembly is indicated generally at 14. Finally, the final blend product tank is indicated generally at 16.

An intermittent motion on-off ("digital") multi-channel liquid product blending system which produces very small flow synchronized and completely blended batches of liquid product at a rate greater than a specified take-away rate can function as a continuous stream blending system. It is upon this central concept that the method and apparatus architecture disclosed herein is based. The significant virtue of this system design methodology is that the extremely high blend ratio accuracy (typically 0.15% to 0.25%) of each stream component is achieved on a pre-engineered and highly proven basis which eliminates the sources of error and operating problems found in hydraulic flow feedback loop designs. And, perhaps equally important in practical terms, the final blended continuous stream flow can be turned on and off at will with absolutely no penalty in accuracy. The system volume is very small and all finished product can be utilized at the end of a blend run. Finally, the output of the system can be directly and automatically varied to conform to the take-away requirements, thanks to the on-off digital design.

At the heart of each digital (on-off) stream ratio dosing flow channel 12 is an electronically controlled servo driven rotary pump (or stream ratio dosing pump) 18 and a mass meter 20 which utilizes the dosing technology as embodied in U.S. Pat. No. 5,996,650 which is incorporated herein by reference thereto. These stream ratio dosing units are typically combined together and integrated with a PLC and a PC based color touch screen operator interface to form a powerful continuous stream blending system. With this system architecture, each stream ratio dosing channel manages one of the liquid components to be blended into a finished product, the components being in liquid supply tanks 22, 24, and 26 as shown in FIG. 1. Each tank is provided with a level controller 28, and breather 29. Each stream ratio dosing channel turns on simultaneously and runs for a pre-defined dose time. This flow pattern common to all streams is termed herein as synchronous flow. Each channel's synchronous flow is digitally altered on a self-teach basis until the precise mass ratio dose required is delivered in the defined run time. This overall streams ratio dosing arrangement is as taught in U.S. Pat. No. 6,186,193 B1. At the distal end of each stream ratio dosing subassembly 12 is a positive shut-off dose valve 30.

Unique and novel to this disclosure, the synchronized dose from each liquid component channel is deposited to a small constant pressure dose streams combining chamber 40 generally located at the infeed to a discrete servo driven streams mixing pump 42, having an suction port 42.1 and a discharge port 42.2. This pump runs at a flow rate exactly matching the combined flow rates of the blend streams 12. As these blend stream constituents are precisely metered and dosed into the combining chamber, they flow into the streams mixing pump 42 where complete blending is accomplished using one or more static or dynamic mixer elements 44 generally located at the discharge of the mix pump 42. The completely blended product is then displaced by the mix pump into a small finished blend tank 50 at a net delivery rate greater than the maximum possible flow demanded by the filler.

Maintaining the dose streams combining chamber 40 at a constant pressure in order to optimize streams ratio dosing accuracy and stability is achieved by exactly matching the outflow of liquids from the chamber 40 to the streams inflow rates into the chamber. This is done by causing the flow rate from the mix stage pump 42 to exactly match the combining stream ratio dosing flow rate. This flow rate matching, in turn, is generally accomplished by maintaining the combining chamber liquid level at an essentially constant height within the chamber via level controller 46. In addition, component supply levels are also maintained at an essentially constant height by level controllers 28. By this arrangement, the dose stream pressures are optimally low and invariant, while the typically high and less stable back pressures associated with streams mixing are divorced and isolated from the dose streams. Effectively, the mix pump can be sized as necessary to deal with the relatively high mixing back pressure requirements without in any way compromising the desired low pressure optimization of the ratio dosed streams. With this arrangement, there can be no loss of precision in the mechanical combining of the ratio doses. Since there is no flow through the mix pump unless there is matching inflow into the streams combining chamber, the flow streams remain mechanically synchronized in terms of linear flow motion and thus combine in ratio on a flow through basis essentially as though they were directly combined on a hydraulic basis without use of a flow through streams combining chamber.

This unique and novel method of subdividing streams ratio dosing from streams mixing allows continuous stream blending systems to be built using servo pump-mass meter intermittent flow synchronized dosing techniques which result in the very highest levels of blend accuracy and reliability.

In operation, the various liquid components comprising a product are synchronously ratio dosed through mass meters 20 and dosing valves 30 into a small ratio dose streams combining chamber 40. This chamber is typically at atmosphere through breather 48, but can be blanketed with atmosphere or an inert gas at a low or defined pressure.

Critically, the chamber 40 is maintained at an essentially constant pressure. Each component ratio dose is flow synchronized via suitable electronic controls to the other component ratio dose streams so that they all start simultaneously and end simultaneously. Each dose stream has a known precise repeatability, by design, which can be directly empirically measured and verified. Each dose valve 30 is a true fast-acting positive shut-off device. Thus, the entire dose fraction of each liquid component is guaranteed to enter the combining chamber with each blender system cycle.

The dose stream combining chamber 40 is directly coupled to a servo driven mixing pump 42. The mix pump flow is electronically matched and locked to the combined flow rates of all of the constituent streams entering the dose stream combining chamber 40 by means to be detailed further on. Thus, as the liquid ratio dose streams enter the chamber, they are pumped out by the streams mixing pump at exactly the same rate. The flow of each stream down through or into the cylindrical combining chamber is laminar and synchronized so precise ratio combining is mechanically achieved as each liquid component enters the mix pump. Thus, flow through the entire system is synchronous.

The use of a streams mixing pump stage separate from streams ratio dosing plays a crucial role in assuring straightforward operation of the system, free of "glitches" or "quirks". This is because the streams mixing pump stage guarantees that the back pressure imposed on each dose stream by the combining chamber is very low (typically at or near atmosphere) and, above all, invariant.

Because the streams combining chamber back pressure on each dose stream is low and highly stable, the electronic auto tune control system quickly achieves the correct stream dose in the correct time (synchronization) and easily holds synchronization from system cycle to system cycle with only small, rational "trim" corrections required.

Looked at from the viewpoint of each ratio dose stream channel, the use of a low or constant pressure combining chamber synchronously feeding a mix pump assures that the back pressure on each dose stream is essentially defined by the system components used in that channel and not by any other blending system element and particularly not by the pressure of the dose combining environment. Thus, there is essentially no interaction affecting the ratio dose from one channel by any other ratio dose stream channel. This is particularly different from prior art where the hydraulically coupled back pressure on the mixing chamber is relatively high and materially affects streams dosing pressures.

Because the dose from each channel is not influenced by the others in the system, each channel can be calibrated discretely and separately. Therefore, the setup values and mass dose remain valid in full dynamic system operation with all channels operating.

The use of a mix stage pump 42 essentially decouples and separates the crucial mass ratio dosing function from the equally crucial streams mixing function. Both functions must be effectively achieved in a successful continuous stream blending system.

With the unique and novel continuous stream blending system architecture disclosed in this specification, the often conflicting engineering requirements of precision synchronized dosing and complete and thorough mixing of the product can be separately accommodated without compromise.

With the disclosed blending system, the high back pressures typically encountered in the use of static and ribbon mixers 44 are readily accommodated by the use of a suitably sized mix pump and servo drive without any concern for the effect this could have on the dosing streams. With the new design there is no back pressure interaction between blending stream dosing and blending stream mixing.

This improved continuous liquid stream blender can be referred to as "N+1 design" where N represents the number of ratio dose stream servo pumps required and the "plus one" represents the servo controlled streams mixing pump.

In operation, the combined flow rates produced by the system are greater than a planned maximum take-away rate. Typically, the combined maximum flow rate is established to be about 30% faster in unit time than the maximum take-away rate.

The elevated infeed flow rates of each formula component allows short (typically five seconds) synchronized runs of each servo pump-mass meter ratio dose stream channel, followed by a short no-flow time of typically about one second or less. This arrangement allows the system to keep up with take-away demand while operating in the digital on-off format. During the off period, each channel's mass delivery and synchronization are checked and adjusted as necessary. A last in-first out (LIFO) averaging method is generally used. Each ratio dose stream channel is electronically set to dose its correct mass dose in the defined run time by adjusting the flow rate of the servo-pump. The dose constitutes the precisely correct mass ratio required by the product formula. With this method of checking and calibration between each ratio dose cycle, long term and cumulative ratio errors are not possible, and system performance is assured.

As each stream component ratio is dosed and then blended by the mix stage pump and ribbon mixer 44, it is displaced into a small finished blend stream tank 50 which typically then feeds a liquid filler through discharge 51. A one second or less "cycle time" is imposed at the end of each aliquot batch, after which another digital batch can be produced. Electronic level controls 52 in the small final blend tank provide for fully automatic start-up to charge the fluid flow pathway. These level controls also automatically control the overall flow pattern in the system. A "max" level control 52a allows for sufficient final blend tank capacity to assure completion of any aliquot batch in progress. A "run" level control 52b causes digital batching to begin whenever tank level falls below the run sense point. The max-run differential is generally tightly set, typically to a few gallons. In practical terms this holds tank level quite tightly about the run sensor level, since this is really the "trip" which initiates digital blending, and when the system is running, product is being made at a rate faster than take-away. A separate pair of high alarm and low alarm sensors guard against any possible feed malfunction. In effect, this small final blend tank is little more than a "bulge in the line" and adds very little to the total volume of the system. All of the product entering this tank is finished product and can be packaged or otherwise utilized.

The finished blend tank is typically at atmospheric pressure, but can also be a pressurized vessel. Critically, the tank can actually be the product bowl or reservoir associated with a liquid filler. These vessels may be at atmosphere or pressurized. As a special case, it is also possible to utilize the mix pump directly as a filling pump. In this instance, blended product is dosed directly into a unit of use container with each cycles of the blender. It is important to note that since the filling dose into the container must be precise, the dose is defined by the mixing pump. Thus, any detected level change in the streams combining chamber is corrected by altering all the stream flows appropriately rather than the mix pump. The logic described elsewhere in this disclosure applies, but to the streams servo-pumps rather than to the mix stage servo pump.

In the event that a stop command is received by the blending system when the final blend tank is just below the max level and a five second run cycle has just started, the synchronized dose run must be completed to assure that blend accuracy is maintained. Thus, a blend cycle completion capacity equivalent to one complete digital blending cycle is built into the design. By way of example, in a 200 GPM continuous flow system of the present invention, one digital blending cycle is typically no more than 25 gallons in volume, while in a 100 GPM system it does not exceed 12.5 gallons. Thus, with this small buffer volume, the system can be started and stopped and restarted at any time without the possibility of introducing proportioning error because any dose in process can be completed, without compromise, regardless of system status.

Another major advantage of the disclosed continuous stream blending architecture is that adequate tank volume provision can be made to insure the availability of sufficient blended product to complete all fills in progress on the filling line, even with a forced shutdown of the feed streams. This assures an orderly packaging line shutdown without the possibility of partial fills. It is also important to note that any product reaching the filler must be, by definition, correctly blended.

In practice, the fact that each ratio dose stream channel can be calibrated using a software based self-teach and self-correcting program to define the ratio dose in the defined flow period on a non-interacting basis with the other dose streams is particularly significant. This complete lack of "cross talk" eliminates codependent streams adjustments entirely. In hydraulic designs, when a flow rate adjustment on one stream is made to correct a flow rate or ratio shift or a change in take-away flow, the change forces an adjustment on the remaining streams. Thus, for example, if one stream flow is reduced, total back pressure drops and flows from the other streams tend to increase. This forces a reduction in the flows on the other streams which further interact on a never-ending series of forced adjustments. This phenomenon can become so severe in some cases as to cause erratic and non-rational results from self-correction software designs. The cross talk phenomenon described cannot exist with the improved blender design detailed herein. The new design, free of streams interactions, substantially simplifies the control software and setup computations and speeds up achieving set-points.

As previously noted, in the present invention streams flow and mix pump flow are matched, while the streams combining chamber is most often kept at atmospheric pressure.

With the chamber at atmospheric pressure, each stream is discharging into the chamber with an inherent back pressure very near to atmosphere, since a typical column of liquid exerts only 0.443 PSI per vertical foot of height. With only one or two feet of vertical column height in the disclosed invention's streams combining chamber, inherent pressure cannot exceed 1.0 PSI.

Critical also to understanding the operation of the apparatus is the clear understanding of the role of maintaining the streams combining chamber at a constant level. The role is twofold. First, a constant level guarantees a constant chamber liquid column pressure, which assures the best possible ratio dosing stability and repeatability. Second, the constant level technique assures near absolute synchronous flow matching of ratio dose streams flowing into the flow-through streams combining chamber and the flow out of the chamber as induced by the mix stage pump. This, in turn, assures that the streams must combine in correct flow ratio.

A constant level in the streams combining chamber is preferably sensed by one or more level controllers or sensors. A single sensor can be used which reports a range of levels as an analog or digital signal. Examples of these level sensor types include capacitance, ultrasonic, and guided wave radar types. A sight glass could also serve. When these or equivalent types are used, the output is used to control the flow rate of the mix pump during a blending flow cycle with the objective of holding the level constant. The signal can act directly on the mix pump drive or can be passed to the main control electronics, typically a PLC, and then on to the pump drive. The control objective is to measure any level error above the desired setpoint (mix pump flow too high) or any level error below the desired setpoint (mix pump flow too low). An error signal can act as a servo signal with flow rate correction occurring to null the error. More typically, a defined correction proportionate to some portion of the error is made followed by a new level sample, followed by appropriate action, with this process continuing throughout the flow event.

Another practical methodology uses two points of level control, typically relatively closely defined in terms of vertical separation. This can be referred to as the point-to-point control method. In this case the upper point defines a maximum level and the lower point defines a minimum level. These level sensors are defined as point contact types and can be conductance, capacitance, insertion loss, vibrating forks, ball floats, and the like. In practice, the mix pump flow is regulated by reducing its flow when the maximum level sensor reads, and increasing its flow when the minimum sensor reads. The control design provides for a continuous self-teach feature that "learns" the time interval of the level shift from one limit to the other and gradually slows the rate of correction until the level changes at a very slow rate. This has the effect of slowing the rate of change of the mixing pump flow.

The two level points define a volumetric interval. As a typical example in a mixing chamber of a six inch diameter, the two points might be separated by one inch of vertical change. Thus, the level control points define a volume of 0.1223 gallons. The excursion of level can be adjusted to take many minutes but consider a one minute excursion from one point to the other. In a 10 GPM outflow stream system, stream flow and combining flow is typically at 13 GPM. Thus, over one minute flow can change by 0.1223/13, or less than 0.1 percent. As flow goes up, control results get even better as a percentage of flow, and in smaller systems a smaller geometry maintains a tight control format. It should be noted that a single level sensor reporting two level points can also be used in this format.

Still another level control methodology can be used when the streams combining chamber pressure is at atmosphere. In this case, the reservoir is closed to atmosphere just prior to the start of a blender cycle (streams flow synchronous with combining and mixing flow). Then, a pressure sensor 70 monitoring the sealed gas head of the chamber senses level change where an increase in pressure signifies flow too high and a decrease, flow too low. The resultant signal can be used for control purposes as previously explained in the first two cases.

A special case exists where the streams combining chamber is operated above atmosphere. This generally occurs where it is desired to use a particular gas, such as an inert gas, in order to limit liquid contact with oxygen or prevent exposure to moisture in the atmosphere or to prevent an adverse reaction mediated by trace contaminants or the like. In these cases, the pressure head is generally low, in the range of a few PSI and almost always less than one atmosphere.

When the combining chamber is operated at any pressure above atmosphere, any of the level control methods previously described to achieve flow synchrony can be used, provided the level sensor chosen can operate in an above atmosphere environment. In this case, it is also possible to use a digital pressure control device to good advantage. The pressure control unit uses a pressure sensor 70 to measure pressure in the combining chamber, and then very rapidly add pressurized gas or exhaust gas to establish and hold a given pressure. During a blender flow event, the two gas pathways are disabled, and the pressure sensor 70 controls liquid level very much as previously explained.

Another important aspect of the invention concerns the ability to establish synchronous flow from a zero flow state to a maximum flow of a given stream during ratio dose flow, and then back to a zero flow state. It will be appreciated by one skilled in the art that a servo-pump combination of a given size and operating on a given liquid against a given discharge pressure will have a certain rate or curve of acceleration from rest to some specified RPM (and thus flow rate). With modern servo drive technology this rate is adjustable up to a maximum acceleration rate constrained by the size of the drive, the pump imposed load, and the safe operating area of the drive electronics. This being understood, it is evident that the large variations in the size of the drive and pump combinations utilized in the present invention will result in varying acceleration and deceleration rates. As previously explained, closely matched or synchronous flow is essential to the precision of operation of the present invention. Thus, an automated means to match the acceleration and deceleration of all ratio dose streams in a given system is unique and novelly provided for.

In an embodiment of the present invention, the largest servo-pump is typically the mix stage pump. Thus, the ramp up rate and ramp down rate is considered to be the slowest within the system and is thus designated as the baseline against which the other servo-pumps are matched. This is accomplished by first defining the minimum ramp time to maximum RPM using a sampling method whereby the servo drive encoder count is periodically measured against a standard interval. When the count-interval product is unchanged, the acceleration period is ended. Thus, the acceleration period can be closely defined. This, in turn, allows the acceleration rates of the other servo-pumps to be adjusted until the mathematical count-interval product of each drive-pump unit is time matched to the mix pump. This matching achieves a synchronization of all pump acceleration rates in the system. It will be understood that matching these flow curves assures that all ratio dose streams remain in ratio. The same logic and methodology is employed for the deceleration part of the ratio dose flow event.

Another aspect of flow matching involves altering the actual servo-pump rotation time or times of one or more of the ratio dose servo-pumps. It is known that some liquids do not respond in an absolutely hydraulic manner when a motive force is applied to induce flow. Thus, for example, liquids with significant aeration or gas content are compressible and do not necessarily flow instantly. Likewise, liquids with semi-deformable or compressible solids behave in a similar way. An example of this might be an orange juice concentrate at low temperatures where there is significant pulp (cellulose) content. Other liquids are viscous and dilatent and do not flow in a strictly linear way. There are innumerable other examples. When such a liquid is encountered in the present invention, a novel adjustment can be made to preserve flow synchrony. In the present invention, all ratio dose flow occurs during a highly defined flow period, typically in the range of three to five seconds. By example, in the case of a 5000 mS flow period, it is possible to delay one or more stream flows until the latent stream flow has begun, and then to deliver the current dose on each delayed channel in the remaining available flow period. In this way, precise flow synchrony can be maintained. Thus, if a stream is latent by 300 mS, the other channels can be delayed for this period and then the correct ratio mass dose delivered in the remaining 4700 mS.

In considering the aspects and embodiments of the present invention, it is important to understand that with regard to the streams ratio dosing apparatus, synchronized ratio dosed flow can be established using many types of pumps, including all types of linear positive displacement pumps, all types of rotary positive displacement pumps, time-pressure flow from a discrete pressurized source vessel, or even from all types of inertial pumps such as centrifugal pumps. Typically, rotary positive displacement pumps are used and preferred.

Likewise, while Coriolis mass flow meters are preferred, any suitable type flow meter can be used including magnetic flow meters, turbine flow meters, displacement flow meters, vortex meters, ultrasonic meters, and so on. It is important to note that Coriolis meters give direct mass flow capability. It should also be noted that because each servo-pump typically doses to a terminus pressure at or near atmosphere in the streams combining chamber, excellent volumetric results are obtained by servo-pump dosing without any use of discrete flow meters.

With regard to the Coriolis mass flow meters preferably used in the present invention, a novel method, herein termed the density tracking method, allows use of an oversized mass meter where necessary. It is well understood that any flow meter, including a Coriolis type, has a specified range of flow within which best accuracy is possible. In the present invention, many of the ratio dose stream flows are extremely low and constitute only a small fraction of one percent of total flow. Because the dose ratio is small, the absolute dose size is very small. This, in turn, results in a requirement for a Coriolis mass meter with a very low flow range capability. Such meters universally have extremely small flow pathways. Because of the nature of many liquid streams, some containing small solids in suspension, some being highly viscous, and some being very shear sensitive, these small meters are prone to plugging or blockages, and also produce very high back pressures even with liquids of moderate viscosities. These effects and limitations can directly impair the accuracy and reliability of the system herein disclosed. A novel method is herein claimed to overcome this limitation while still providing mass dose system operation. With this method, a larger mass meter is fitted downstream of the servo-pump. The meter is sufficiently large as to have flow tubes that will not clog or block or present high back pressure to the servo-pump during ratio dosing. Because the mass meter is oversized, it will not provide adequate flow accuracy to directly define a mass based dose. However, it will provide a highly accurate (typically to three decimal places or better) liquid density reading. This capability is essentially inherent to the Coriolis meter design. This density reading can be obtained prior to each ratio dose flow event. Because the volumetric displacement per increment of rotary servo-pump rotation is known and directly verifiable, the necessary mathematics is executed by the control PLC or PC prior to each dose to deliver an exact mass dose ratio to the streams combining chamber. Thus, a mass meter is used as a densitometer where density can be known and a volumetric dose is delivered by the servo-pump such that a net weight dose is provided by simply calibrating the weighted volumetric pulse value at any known density and then varying the pulse count for subsequent doses ratiometrically up or down to track density change, and thus deliver a constant and consistent mass dose into the streams combining chamber.

The novel density tracking method disclosed herein can also be used in the opposite case, where relatively high flow rates are encountered. In many blending applications appropriate for the present invention, the primary liquid component may flow at rates well over one-hundred gallons per minute. It is well understood that, even at moderate back pressures, many rotary positive displacement pump types exhibit a degree of pulsatile flow. It is also well understood that flow meters in general and Coriolis mass flow meters in particular are relatively intolerant of pulsatile flow. When challenged against pulsing flow, these meters exhibit degraded flow accuracy and, at a certain point, will no longer generate a useful flow signal. Under these pulsing flow conditions, even though the flow meter is within a suitable design flow range, precision dosing is not possible. In this case, using the meter as a densitometer as previously detailed for low flow allows precision dosing to be achieved as required by the disclosed invention.

Another unique and novel means to fit a formula and its constituent ratios to mass meters to gain best efficacy of operation is known as and termed herein as formula inflation. As previously explained, it is possible to encounter a blending formula where one constituent stream must flow at a rate too low for a particular mass meter to provide accurate flow data. In some instances, this can be overcome without resorting to replacing flow stream meters and pumps by simply inflating the entire formula. The effect is to increase the flow rate of each stream. Thus, each stream ratio is multiplied by the same factor. By example, if a stream flow is at X and the meter requires flow at 1.3× for good accuracy, the flow on all channels can be multiplied by a constant of 1.3. The result is a fit on the stream in question. Typically, the flow range on larger flow channels with larger meters is much greater in absolute terms, and thus the technique is frequently successful.

As previously disclosed, the mix stage pump serves to remove the combined streams at a flow rate synchronous to the combined rate of flow of the streams entering the chamber. However, the mix pump is also the motive force for actually mixing the combined streams as well. There are several important disclosures in this regard.

Figure 2:
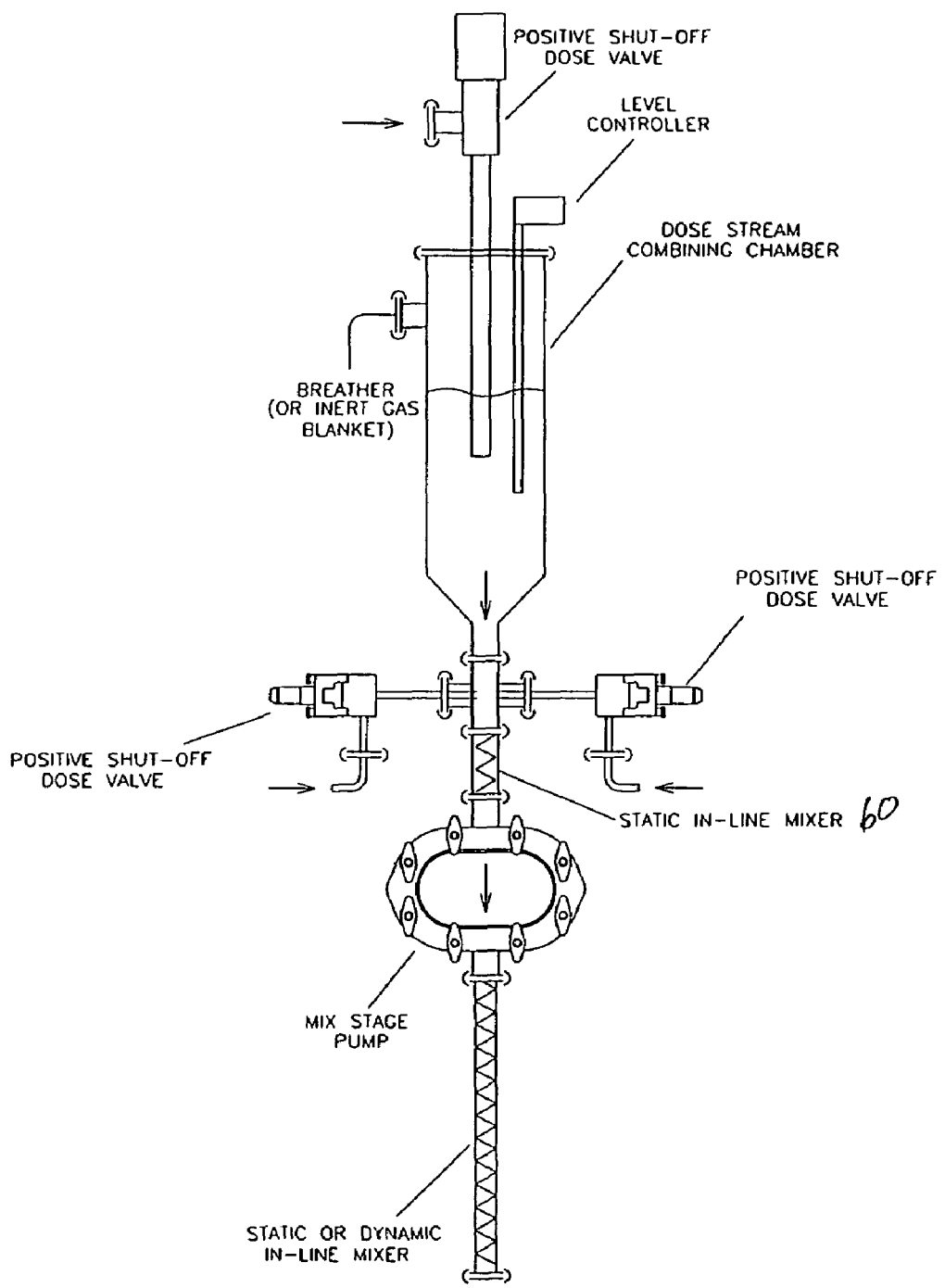
FIG. 2 is a diagrammatic view of the improved continuous outflow stream liquids blending system showing one mixing element on the suction side of the mix pump.
Figure 3:
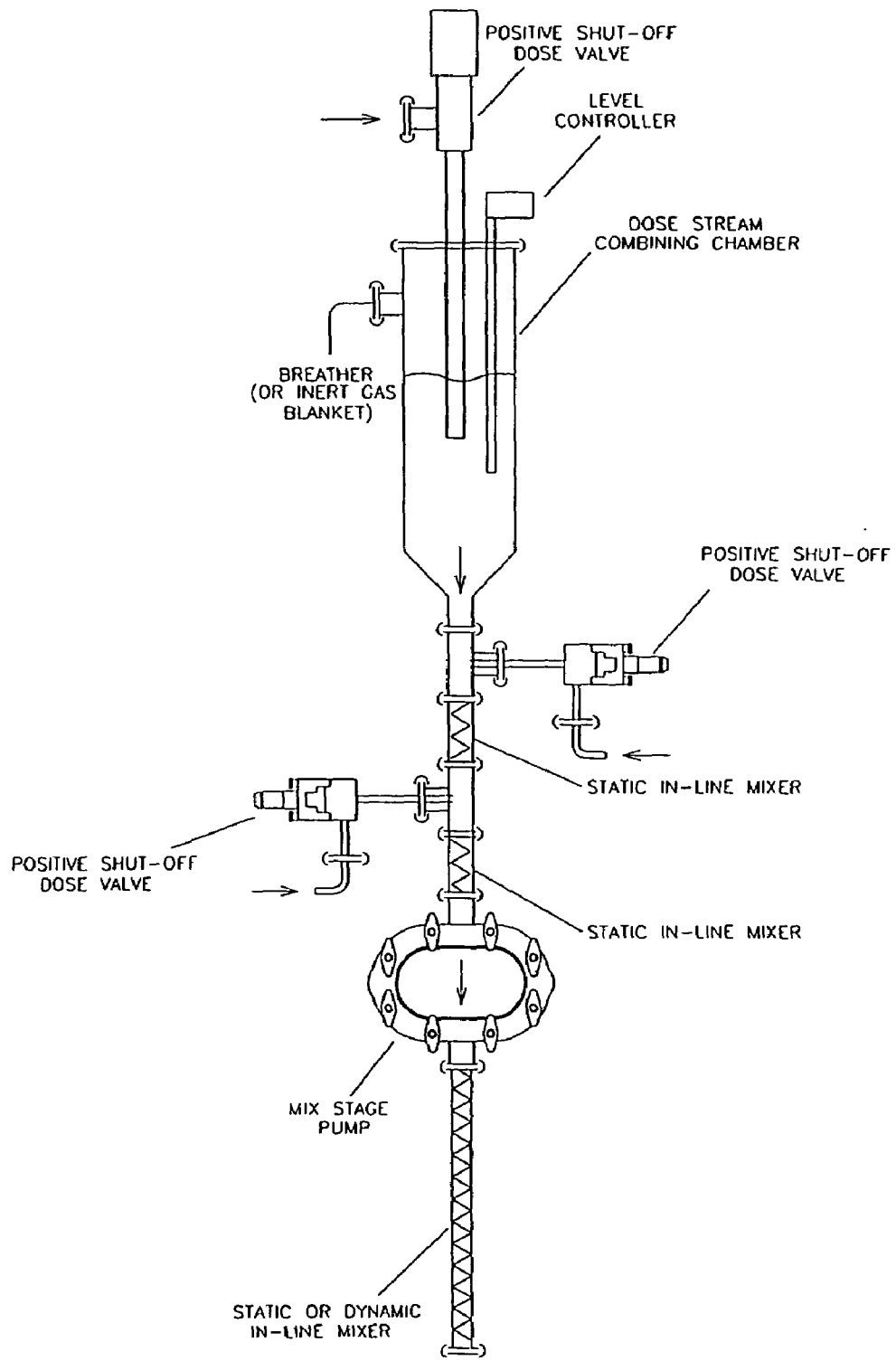
FIG. 3 is a diagrammatic view of the improved continuous outflow stream liquids blending system mixing elements interspersed with streams combining locations on the suction side of the mix pump.
Figure 4:
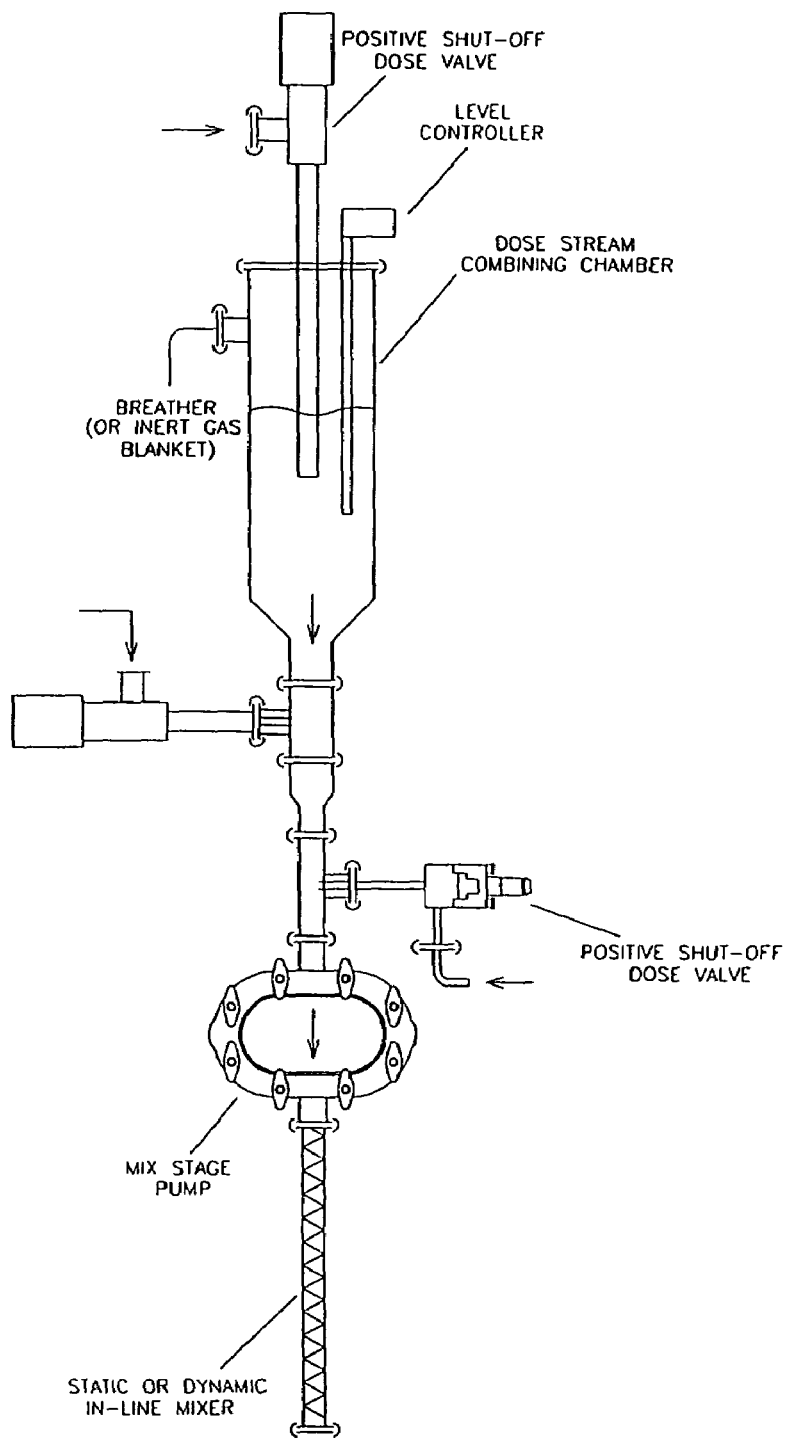
FIG. 4 is a diagrammatic view of a preferred embodiment of the improved continuous outflow stream liquids blending system showing stepped reduction in the laminar flow streams combining locations.
Figure 5:
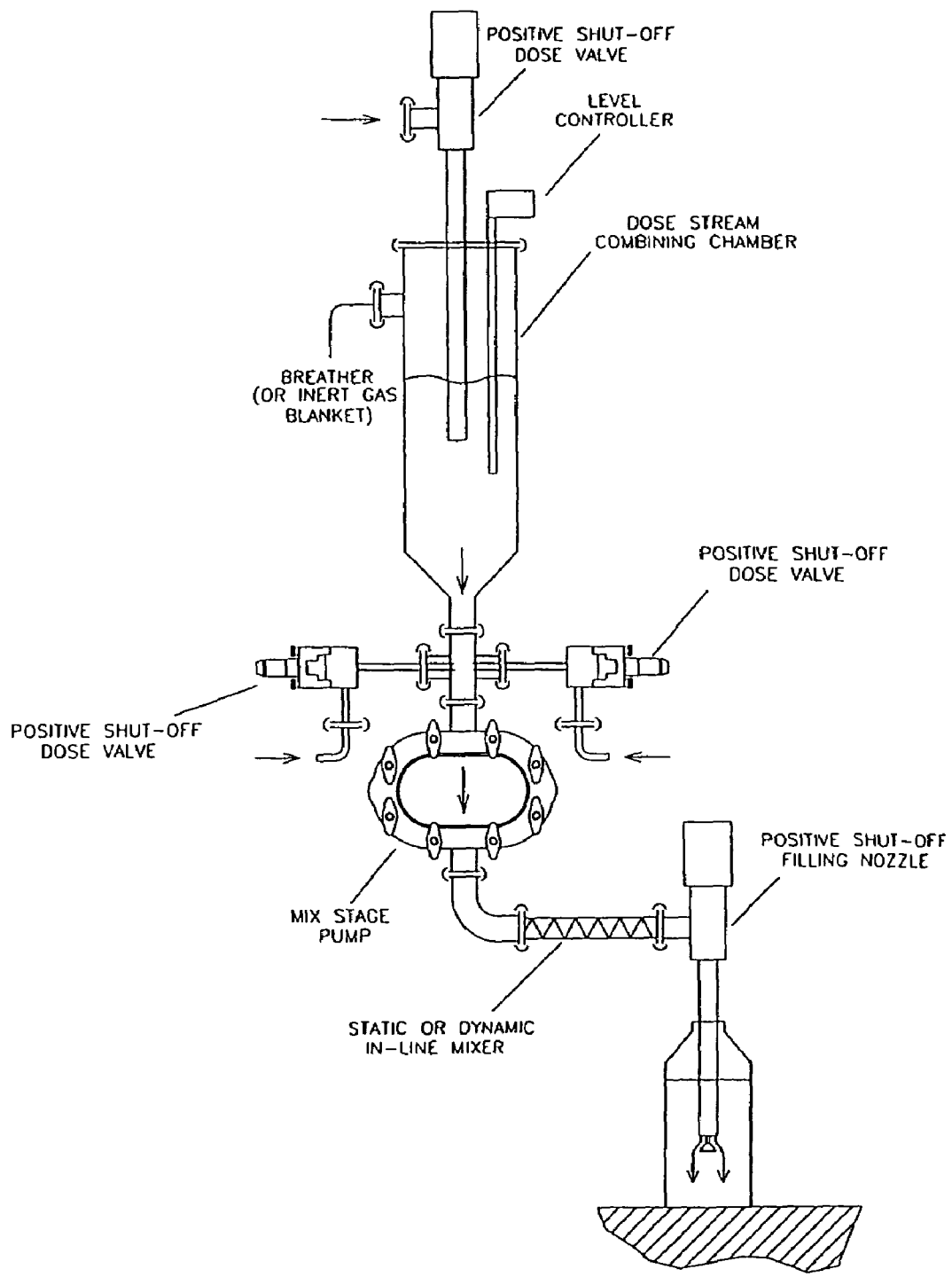
FIG. 5 is a diagrammatic view of a preferred embodiment of the improved continuous outflow stream liquids blending system showing the apparatus dosing blended liquid directly into a unit of use container.
Figure 6:
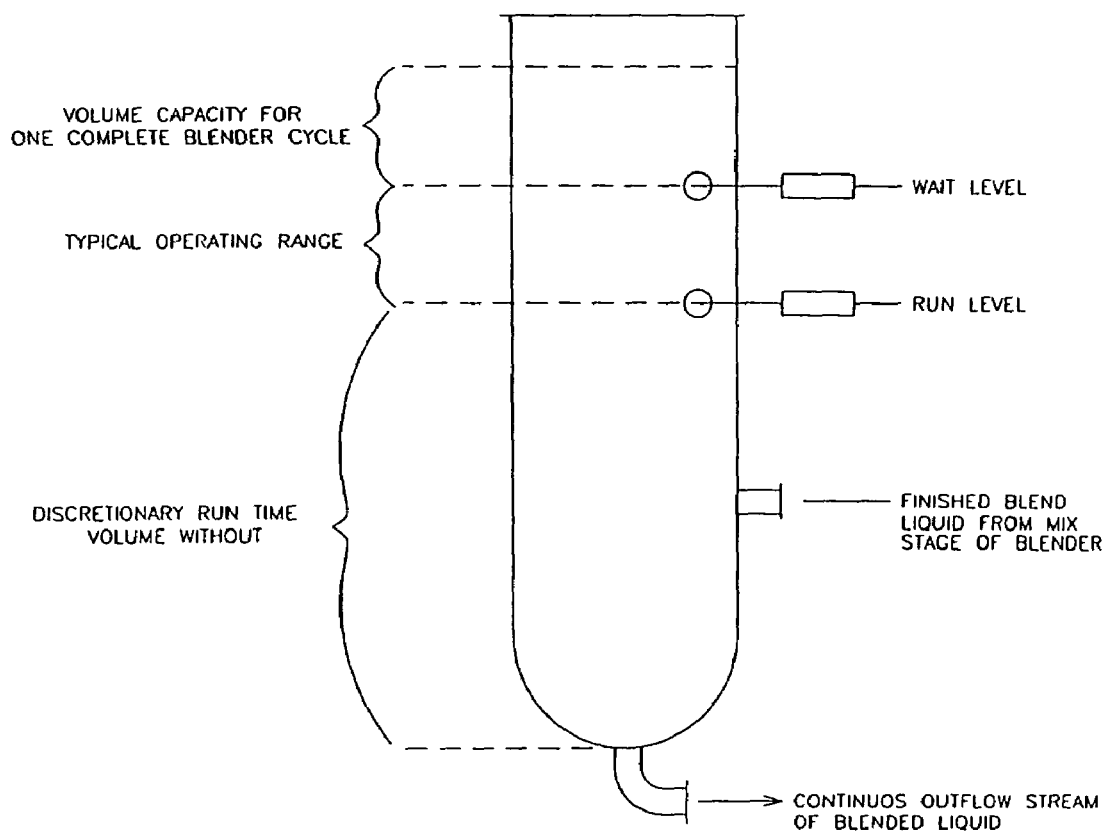
FIG. 6 is a diagrammatic view of a finished blend tank showing typical volumetric partitioning.
Figure 7:
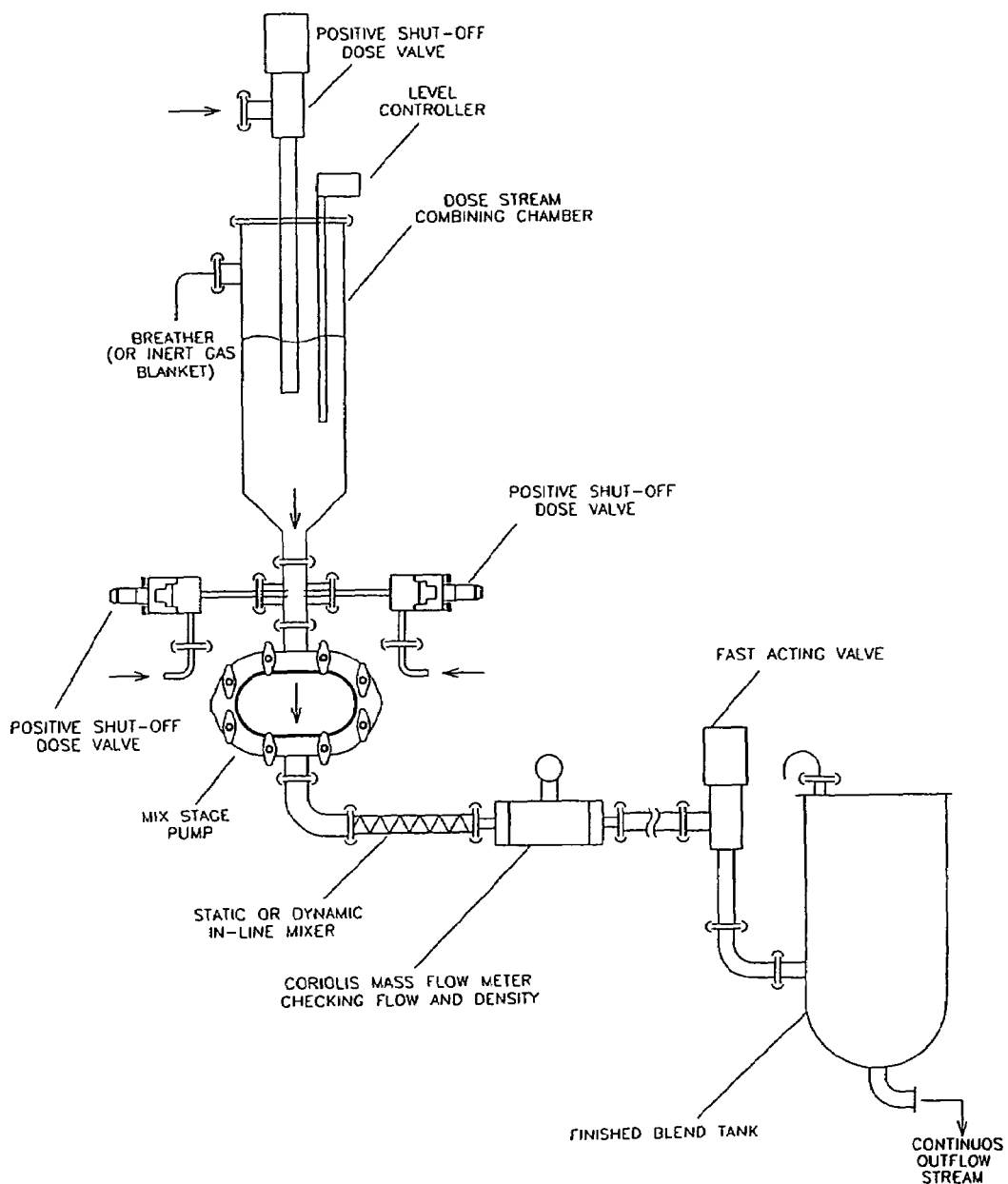
FIG. 7 is a diagrammatic view of a preferred embodiment of the improved continuous outflow stream liquids blending system showing use of a finished blend checking coriolis mass flow meter located after all mixing elements and before the finished blend tank.
Figure 8:
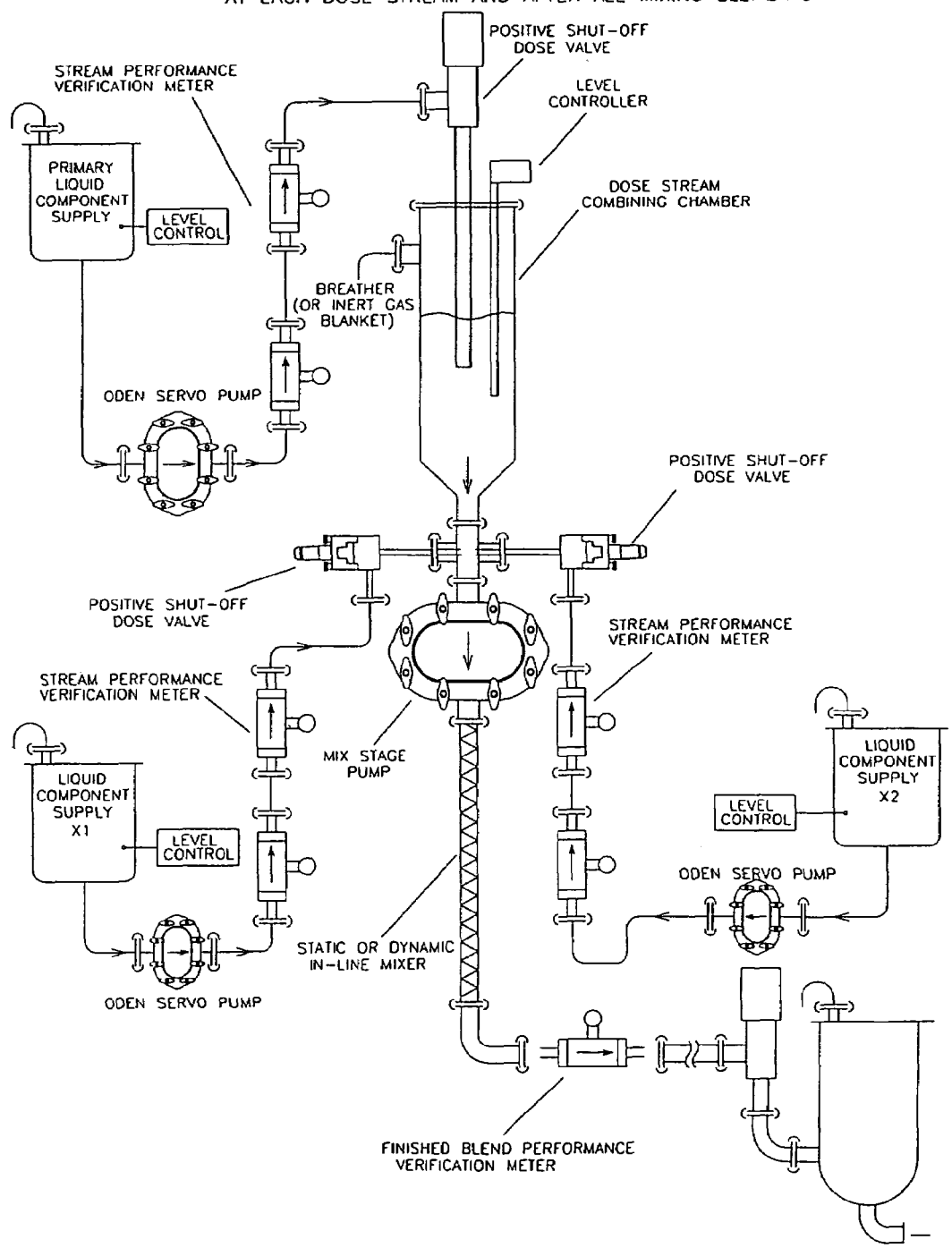
FIG. 8 is a diagrammatic view of a preferred embodiment of the improved continuous outflow stream liquids blending system showing use of independently controlled performance verification coriolis mass flow meters located at each dose stream and after all mixing elements.
Figure 9:
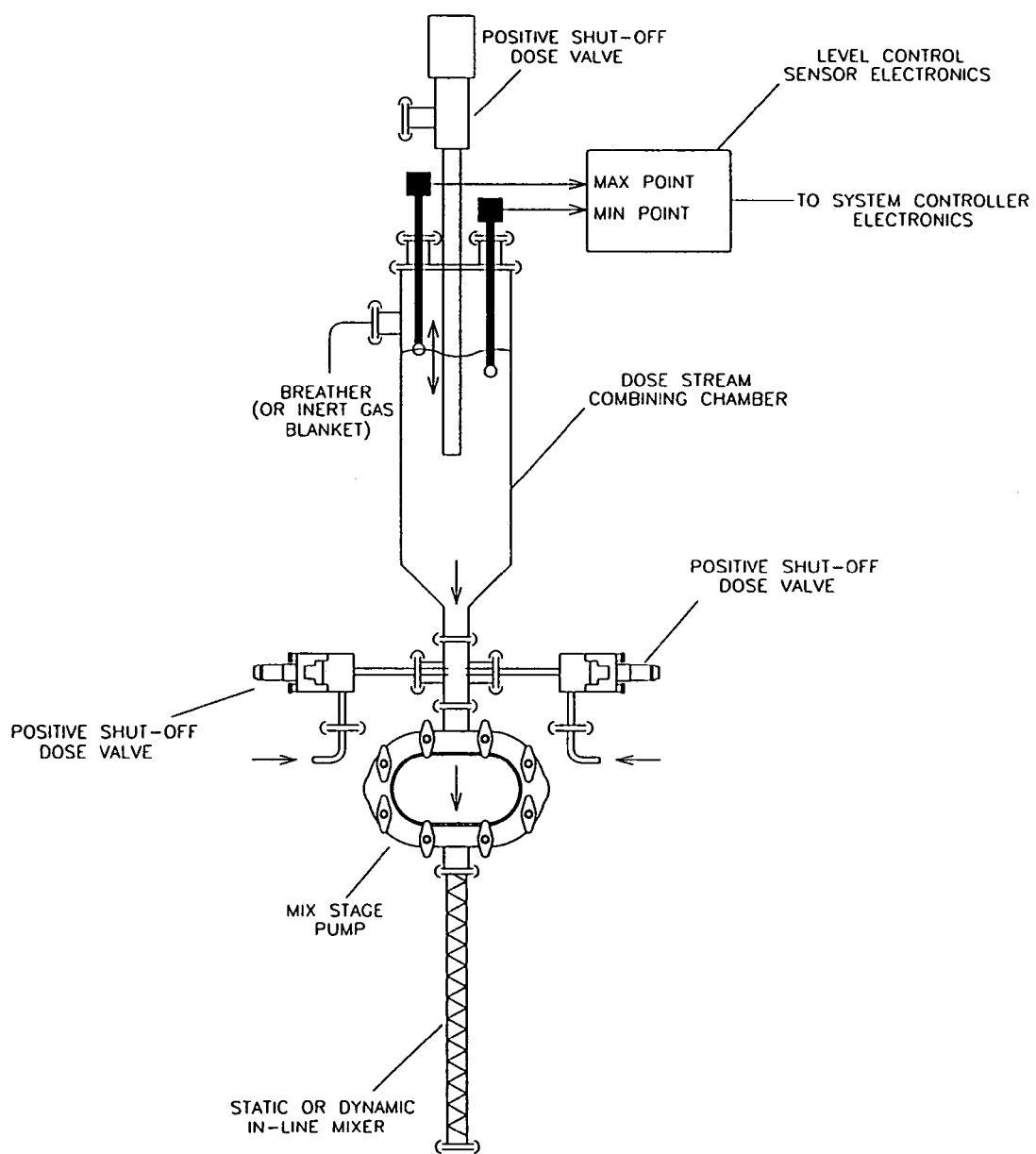
FIG. 9 is a diagrammatic view of a preferred embodiment of the improved continuous outflow stream liquids blending system showing a point-to-point streams combining chamber level control design.
Figure 10:
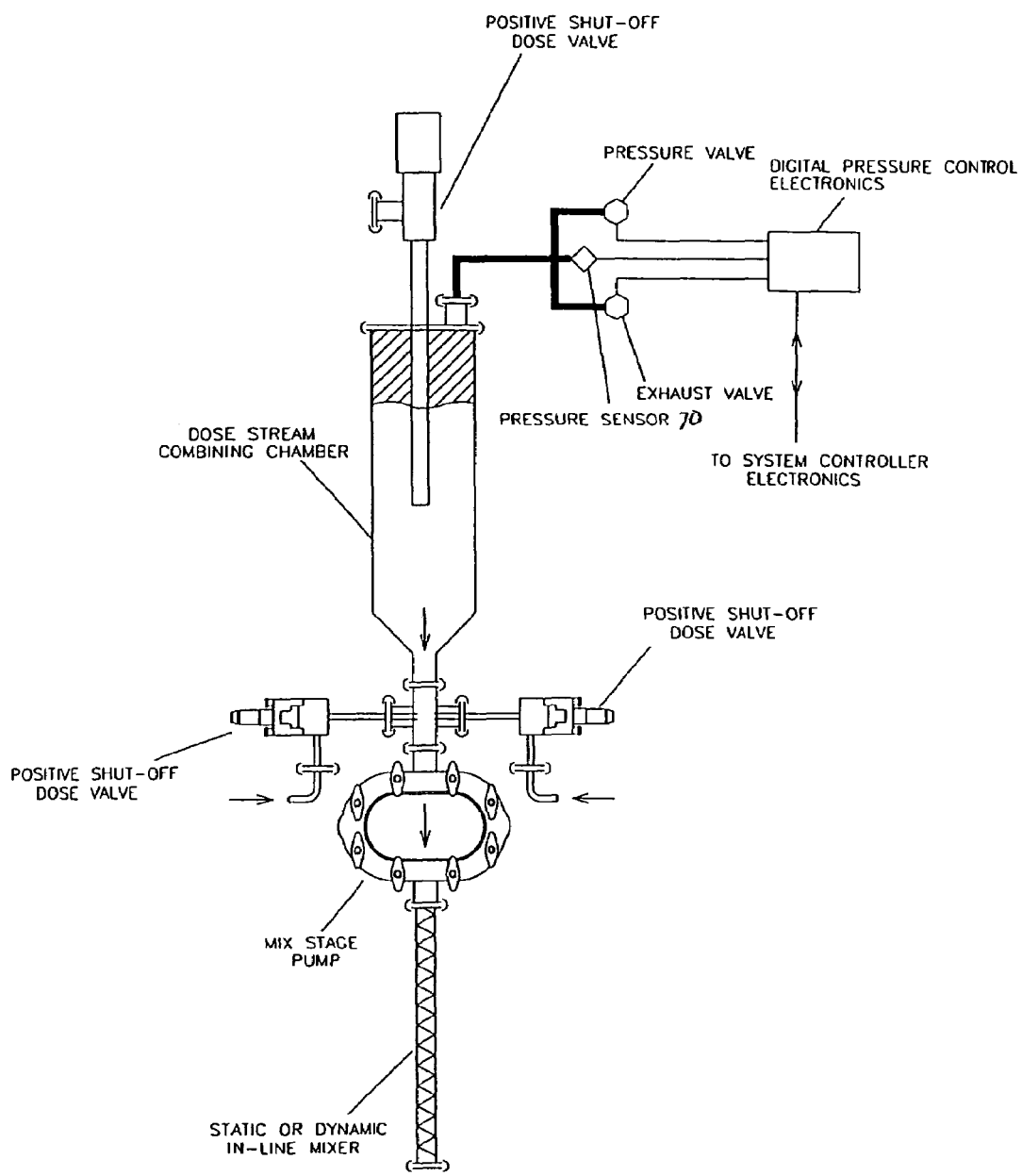
FIG. 10 is a diagrammatic view of a preferred embodiment of the improved continuous outflow stream liquids blending system showing a pressure control design for controlling streams combining chamber liquid level.
Figure 11:
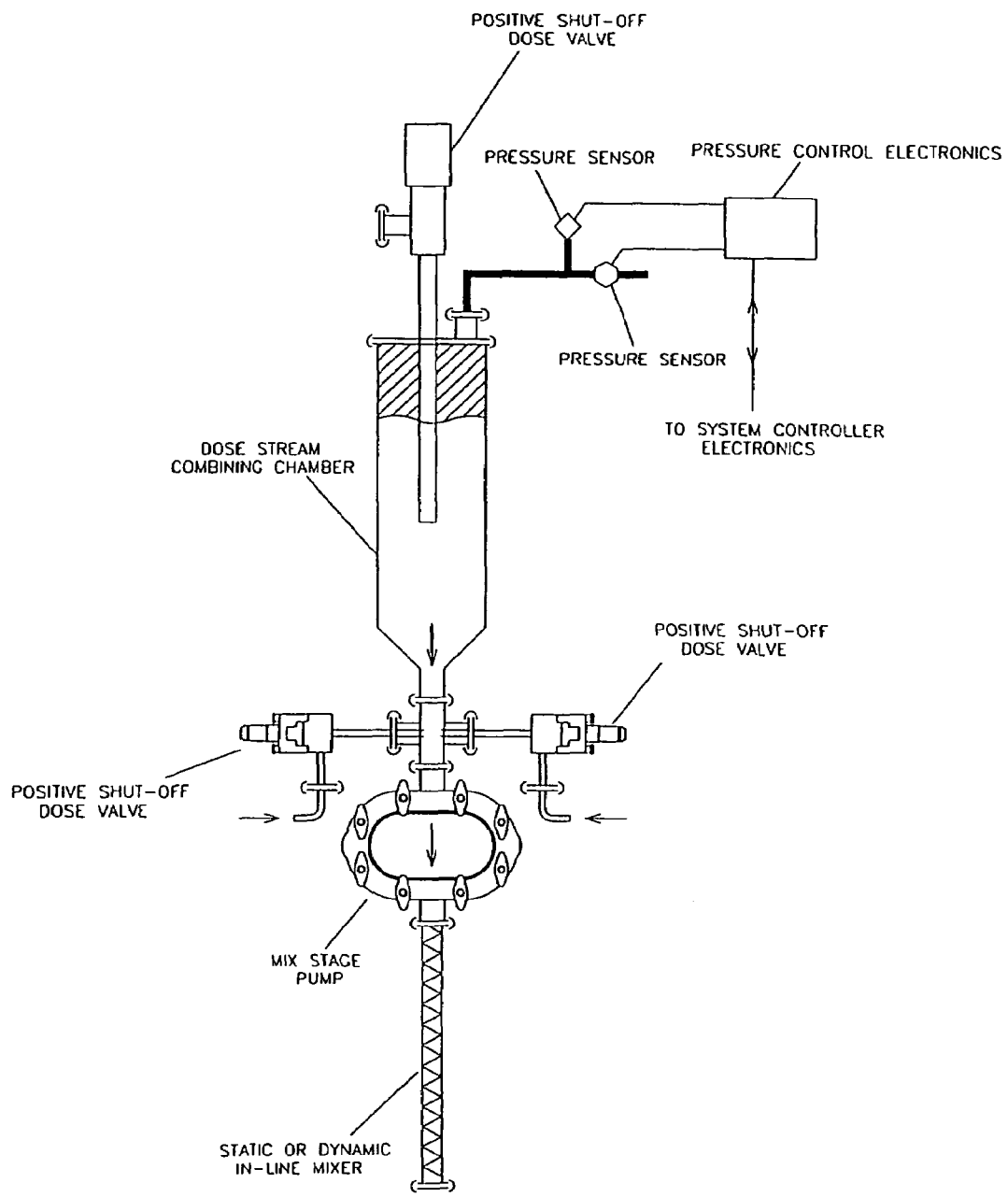
FIG. 11 is a diagrammatic view of an embodiment of the improved continuous outflow stream liquids blending system showing a pressure control design for controlling streams combining chamber liquid level.
Figure 12:
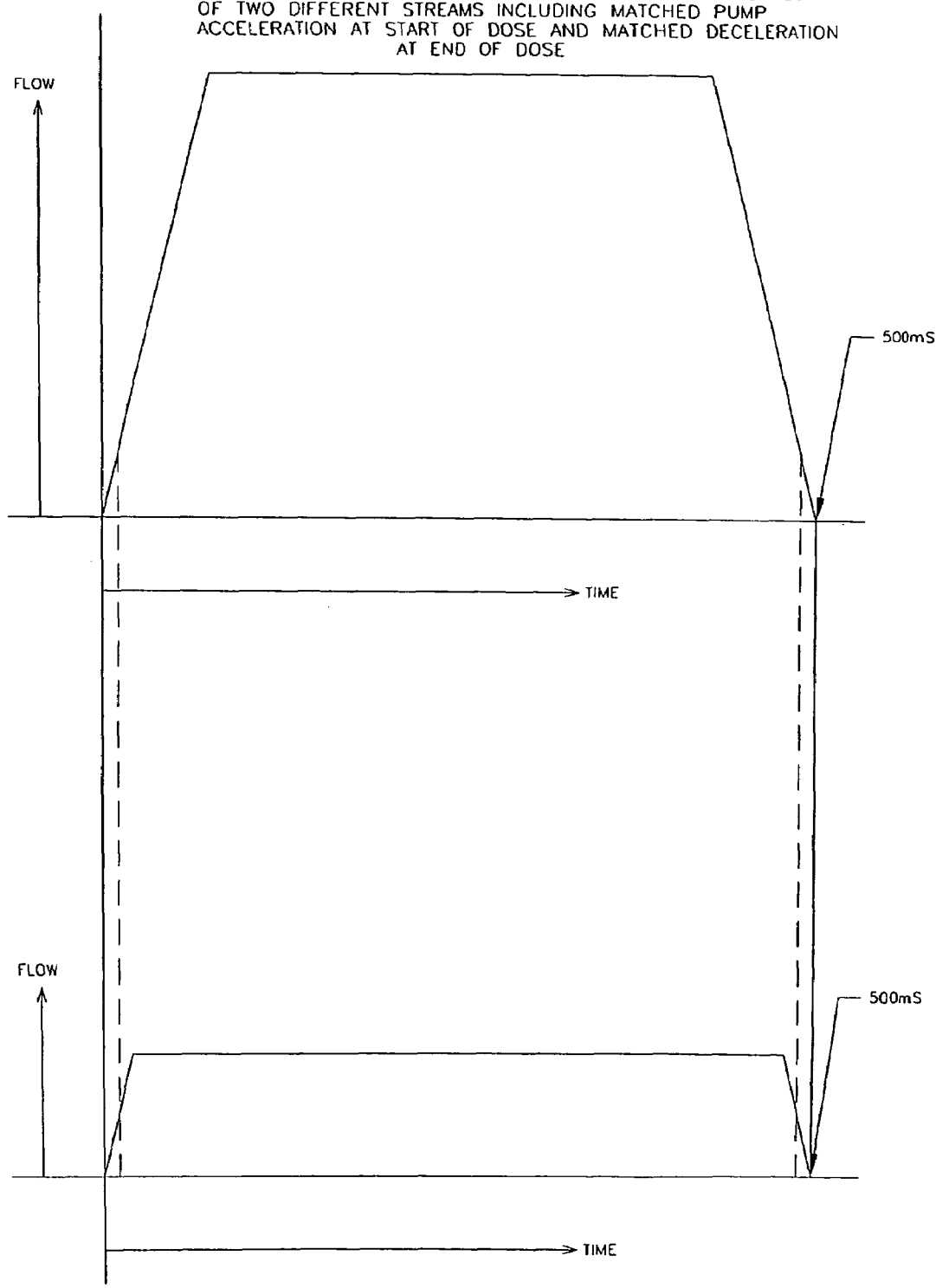
FIG. 12 is a graphical representation of synchronized flow of two different streams including matched pump acceleration at start of dose and matched deceleration at end of dose.
Figure 13:
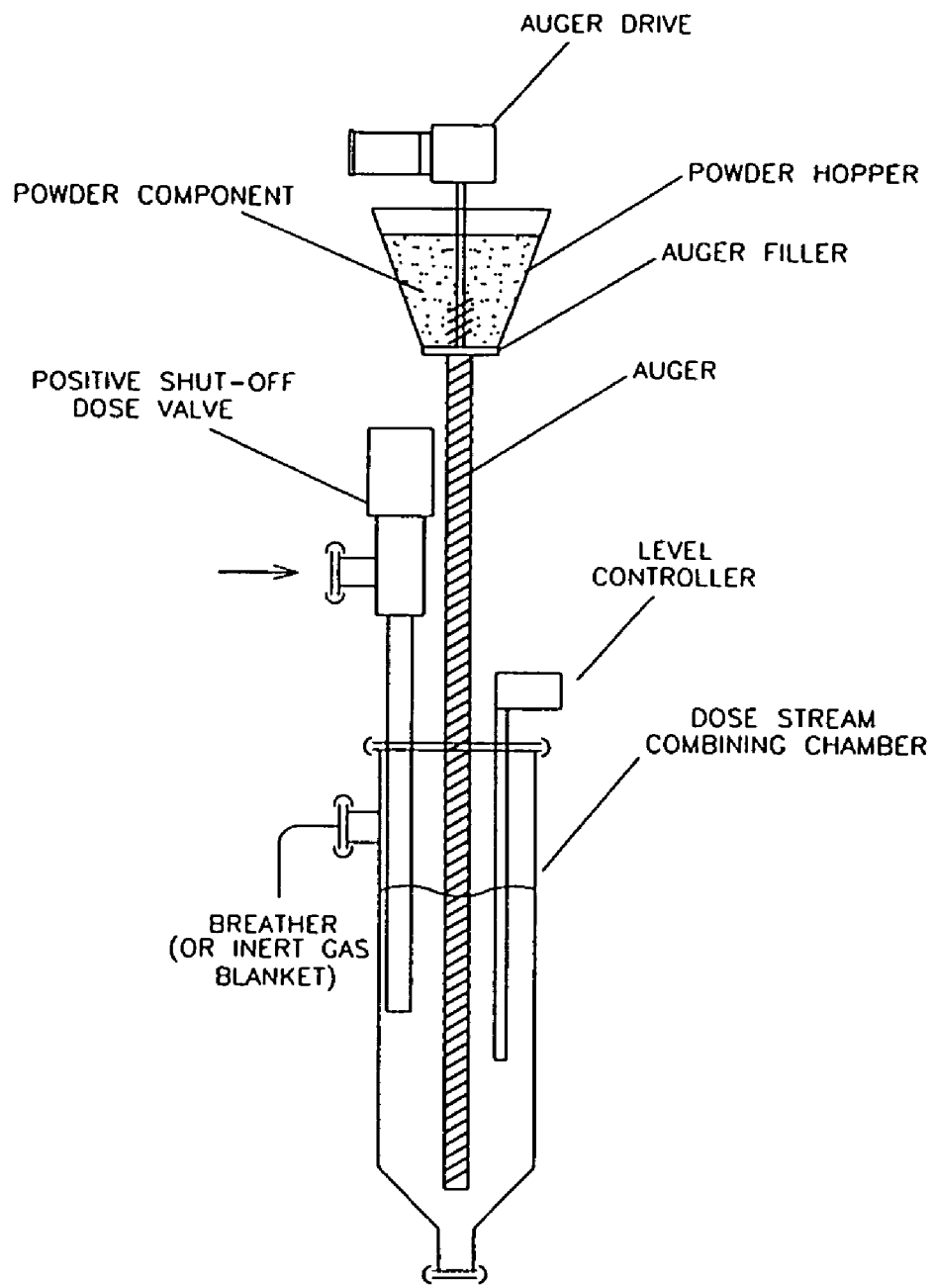
FIG. 13 is a diagrammatic view of an embodiment of the improved continuous outflow stream liquids blending system showing the ability to add solids as a component stream during streams ratio dosing (auger filler shown).

It will be noted that it is possible to begin streams mixing on the suction side of the mix pump by fitting motionless mixer elements 60 (also known as ribbon mixers or static mixers) in the fluid flow pathway between the discharge of the combining chamber and the mix pump infeed port as shown in FIG. 2. More than one element can be fitted. However, use of this methodology is tempered by the possibility of cavitation of the mix pump. Thus, use of mixers on the suction side of the mix pump is often limited to lower or medium viscosity applications. It is possible to gain further use of this method by fitting a larger mix pump with a larger suction port 42.1.

A second aspect of streams mixing is to be found with the mix stage pump itself. Although very dependent upon the type of pump used, many rotary pumps will produce some degree of streams mixing by the pumping action exerted upon them.

The most prominent degree of mixing occurs on the pressure or discharge side of the pump. The mix pump typically serves to drive the liquid through static mixing elements to achieve complete blending. The virtues of the mix stage pump design become evident when considering the ability to size the pump as necessary to generate the flows and pressures required to get complete mixing without any regard or concern for the ratio streams blending engineering requirements.

An important aspect of the invention is the means of stream combining. As illustrated, the largest ratio dose stream is typically introduced into the largest diameter section of the streams combining chamber via a positive shut-off, fact-acting dose valve. As this stream flows through and out of the chamber it serves as the carrier into which the remaining streams are ratio dosed, also via positive shut-off nozzles. As illustrated, positive shut-off nozzles of this type are well known in the art, being extensively used in liquid filling and dosing applications. As the mix pump operates synchronously with the streams flow, the large ratio flow is moved into a laminar flow area. This cylindrical area is characterized by a reduced diameter compared with the combining chamber, typically matching the infeed port diameter of the mix pump. It is in this area that the smaller fractions are synchronously ratio dosed into the large stream flow as elsewhere detailed. The minor streams each terminate with a suitably sized fast-acting positive shut-off dose valve. These valves can be arranged in a radial fashion about the laminar flow tube, or in a radial-linear fashion, where one valve is downstream of the next and, as desired, radially offset as well. This arrangement provides excellent mechanical streams combining characteristics. In some cases a second stream will have relatively large flow compared with the stream introduced directly into the larger diameter combining chamber 40.1, even being equal in flow to that stream. In such a case, as illustrated, a first laminar flow area can be used at the outflow of the chamber for combining the largest ratio streams, followed by a second, typically smaller or reduced diameter laminar flow section 40.2, for combining the other minor streams.

Another important aspect of the invention is found on the discharge of the mix pump. As illustrated, a fast-acting positive shut-off valve 49, typically similar to those used at the ratio dose streams, is found just prior to the finished blend tank. This valve critically serves to prevent flow through the streams combining chamber, the mix pump, and all associated discharge structure when the mix pump is not running. This, in turn, assures that the streams combining chamber liquid level cannot change by drainage through the mixing stage pump during periods when that pump is not running.

It will be understood by those familiar with the art that liquid products formulas often call for the addition of powders or other divided or granular solids. These may dissolve into solution or be suspended in the liquid or be uniformly dispersed. Often, this requirement is accommodated by first introducing the solids separate from the blending apparatus into one of the streams, and then combining the solid bearing stream with the other liquid constituents at the blender. In some cases however, it is desirable to blend the solids directly at the blender. This requirement can be accommodated as illustrated using an auger filler to directly introduce the requisite quantity of solids into the streams chamber for combining synchronously and in ratio with the liquid streams. As shown, the solids are preferably introduced near the laminar flow area.

In the disclosed invention, automatic priming of the streams ratio dosing apparatus, the combining chamber, and the mix stage pump, is accomplished by first operating the principle stream servo-pump until a designate liquid level is sensed in the combining chamber. The main stream servo-pump is then operated with the mix pump to establish a fluid filled pathway through the mix pump. Each minor stream is then operated, one after the next. In each case, flow continues until the combining chamber registers an increase in chamber liquid level, thus showing that the stream is primed. This sequence and process is fully automatic under the control of a suitable software based program. After this sequence is complete, the apparatus is operated with synchronous flow cycles until the discharge pathway of the mix pump is fully primed. This advantageously allows automatic synchronous flow adjustments to be made. Initially, discharged liquids are not in ratio and can be collected or diverted as desired. It is a particular advantage of this novel start-up method that a minimal amount of liquids are lost to the prime-up routine and that a self-teach process for streams ratio dose matching and synchronous flow is achieved during priming, further reducing waste and enhancing efficient system operation.

In operation, the blender is typically interfaced to a liquid filler in a unique and novel way. There need be no direct control ties or connection to the filler to effect blender operation. Since the filler can demand continuous outflow of blended product based upon its own operating requirements, the level in the blend tank determines blender on-off status. The tank level control signals the blender to blend product or to enter a wait state. Thus, the filler controls the blend tank and the blend tank controls the blender, all in a simple chain-like control sequence that is perfectly efficient. This is referred to and termed herein as ripple back control and is novel to this invention.

Another important aspect of the invention concerns means and methods of performance validation and verification.

It is necessary to make a distinction between system performance validation and system performance verification.

Validation is carried out at system commissioning and periodically thereafter for the express purpose of proving and demonstrating that the device can meet stated performance criteria. The present invention is particularly designed to allow ease of validation by providing a direct sampling capability for each stream. Because each stream operates at very low back pressure, typically at or very near to atmospheric pressure, it is possible to use a second identical positive shut-off dose valve on each stream to directly sample the ratio dose produced. The sample is collected at atmosphere and can be shown to be directly comparable to the dose delivered into the streams combining chamber by the same servo-pump apparatus. Further, the sample dose delivered can be directly compared to that indicated as delivered by the Coriolis mass flow meter. This allows direct empirical calibration of the flow meter. Thus, by first calibrating the stream dose by direct sampling, and then calibrating the flow meter against the direct ratio dose sample, the ratio dose delivered into the streams combining chamber as defined by the flow meter can be highly validated. This procedure can be repeated periodically as required by a validation protocol.

System performance verification refers to a series of ongoing and frequent performance checks which confirm correct operation of the invention in a production setting.

The first level or layer of performance verification is constituted by the control software during each mandatory off period between ratio dose flows. This period is particularly for this purpose. The previous cycle flow time to deliver the correct mass ratio dose is compared to the fixed dose time and the actual dose is compared with the target dose for delivery accuracy. This is done against the standard that the complete dose must be delivered even if the flow rate is not correct. Alarm functions, typically with a plus or minus one percent bandwidth, are provided. Errors below one percent are corrected using ratiometric math correction. Dose and flow rate adjustments are generally based upon a five sample, last in, first out (LIFO) averaging or buffer technique. A larger bandwidth single data event alarm trip is also implemented.

A second level or layer of performance verification can be achieved by using a redundant flow meter in each flow stream, as illustrated. This solution can be meritorious in especially critical applications in that it is possible to provide completely separated power, control, and computation functions for these flow meters, thus achieving a true redundancy of checking and supervision. In practice, the checking meters can provide a separate delivered ratio dose measurement for each stream and a summed outflow dose as well. The meters can also do separate density checking during the no flow period. The comparison and analysis results are typically on an alarm basis with an isolated output to the blender controls to inhibit function, if required. Long term data plotting, trending, and analysis can also be executed using these redundant meters, for comparison with the same data plotting, trending, and analysis formats operating within the actual blender control structure.

Another layer or level of performance verification is inherently provided by the provision of the use of Coriolis mass meters and rotary encoded servo drives. Essentially, during each off period, a stream density is taken and the encoder pulse count from the previous ratio dose cycle is registered. This allows a mass per pulse computation to be made. This result is typically added to a LIFO average and monitored as an alarm function, generally at a ±1% level with a larger single data event trip level as well.

Still another layer of system performance validation is found in summing the density-volume products of all streams as derived from the encoder and flow meter-densitometer and comparing the result to the formula defined total dose stream cycle mass. If the total displaced mass as calculated does not correspond closely to the formula defined mass, an alarm function is triggered as defined and explained above.

It is important to note here that these system performance verification methods are completed on each machine blending cycle and thus no cumulative error or ongoing malfunction beyond one cycle is possible. Said differently, the maximum possible error with these methods of verification is limited in magnitude to one blender cycle.

Still another layer or level of performance verification is available using servo load monitoring. With this method, servo motor current is digitized as a variable frequency and measured against a fixed duration of the ratio dose flow time, in milliseconds. The resultant mathematical product of current and time is characteristic of a flow event and can be normalized using the LIFO technique. Thus, by way of example, if a ratio dose time is 5000 milliseconds, each servo current is measured for 4000 mS from start of flow. It may be that each flow period generates 4000 current pulses. Thus, the current-time product is 16 million. A high current event may measure 5000 pulses giving a current-time product of 20 million. A low current event might measure 3000 pulses giving a current-time product of 12 million. These measurements can be alarmed using the LIFO database and single data point alarms are also used. This method has particular merits. The data are inherently available within the scope of the invention. The data are available on a non-invasive basis relative to the fluid flow pathway. Further merit is found in the ability of this method to detect liquid voids in the stream, pump cavitation, downstream blockages or plugging of the stream, and sudden or unexpected viscosity shifts in the stream liquid, as well as actual servo malfunctions.

Relative to layers of performance verification it is important to note that independent or separate monitoring of encoder pulse count unto itself or against mass dose, and density as a separate database, or against mass dose, are all valid means of performance analysis.

Another layer or level of performance verification is pressure profile monitoring. This method consists of analysis of the product flow stream pressure curve at the discharge of the stream servo-pump and the discharge of the mix pump. With this method, product discharge pressure is digitized as a variable frequency and measured against a fixed portion of dose flow duration. The resultant mathematical product of pressure and time is characteristic of a given dose delivery quantity and delivery rate. With this method, streams performance can be independently measured. Deviation beyond a defined parameter results in an alarm condition. Analysis is completed with each blend cycle of the system. Typically, a LIFO five event average is constructed, and a single sample catastrophic alarm is also used.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A method for the combining together of two or more liquids to form a batch or blend of desired mixture ratio or proportions, the method comprising the following steps:
providing a common constant pressure streams combining chamber, a mix pump and one or mixing elements, and a final blend tank;
flowing two or more streams of liquids of time synchronized ratio defined intermittent doses into the common constant pressure streams combining chamber;
synchronously removing liquid from the combining chamber at a flow rate matching the summed flow rate of the doses flowing into the chamber, the removed liquid then flowing through the mixing elements; and
receiving the mixed liquid in a final blend tank of desired capacity where the blended liquids are available for use on a continuous stream or outflow basis, at a rate up to a defined maximum.

2. The method as set forth in claim 1 wherein the separation of ratio dosing streams flows apart from combining and mixing flow allows absolute separation of ratio dosing pressures from mixing pressures, such that one cannot act upon or alter the other.

3. The method as set forth in claim 1 wherein the flow from any one stream or any combination of streams into the streams combining chamber does not alter or influence the pressure in the combining chamber.

4. The method as set forth in claim 1 wherein the flow rate of any one stream into the combining chamber is essentially unaffected by the flow rates of any other stream or combination of streams flowing into the combining chamber.

5. The method as set forth in claim 1 wherein the size or amount of the ratio dose of any one stream flowing into the combining chamber is essentially unaffected by the size or amount of the ratio dose of any other stream or combination of streams flowing into the combining chamber.

6. The method as set forth in claim 1 wherein flow through the mixing elements is caused by and controlled by the mixing pump only and not by any streams ratio dose flows.

7. The method as set forth in claim 1 wherein the pressure acting on the dose streams combining chamber is atmospheric pressure.

8. The method as set forth in claim 1 wherein the pressure acting on the dose streams combining chamber can be at a specified and controlled and maintained pressure above atmospheric pressure.

9. The method as set forth in claim 1 wherein the nature and configuration of any mixing element has no effect upon the flow rate or size or amount of any ratio dose stream flowing into the combining chamber.

10. The method as set forth in claim 1 wherein the summed flow rate of the ratio dosing streams entering into the combining chamber is substantially equivalent to and synchronous with the flow rate of the combined streams exiting from the combining chamber.

11. The method as set forth in claim 1 wherein rate of flow of streams entering the streams combining chamber is matched to the rate of flow of the liquid leaving the streams combining chamber by maintaining the liquid in the streams combining chamber at relatively constant level.

12. The method as set forth in claim 1 wherein streams ratio dosing pumps are provided for flowing the two or more streams of liquids of time synchronized ratio defined intermittent doses, and wherein any non-synchronous ratio dose flow between streams upon the start of or the completion of a synchronous flow ratio dose flow event is minimized or eliminated by matching the acceleration rates and deceleration rates of the streams ratio dosing pumps.

13. The method as set forth in claim 12 wherein flow meters are provided downstream of the streams ratio dosing pumps, and wherein a mathematical technique termed herein as formula inflation can allow resizing of streams ratio dose flow rates, if necessary, to better fit within the available flow meter operating flow rate parameters.

14. The method as set forth in claim 1 wherein any non-synchronous ratio dose flow caused by one stream beginning actual dose flow earlier in the common fixed dose time than other streams is minimized or eliminated by delaying the start of flow of that stream and then delivering the requisite total ratio dose in the remaining available common dose time.

15. The method as set forth in claim 1 wherein the flow of the ratio defined and synchronized streams through the mixing pump contributes to the streams combining and mixing due to the mixing action of the pump.

16. The method as set forth in claim 1 wherein priming of the system fluid flow pathway with liquids is accomplished by monitoring the level of the streams combining chamber as each stream flow pathway is charged, beginning with the largest ratio fraction stream.

17. The method as set forth in claim 1 wherein the operation of the streams ratio dosing portion is functionally linked to the streams combining and mixing portion by only a single control signal, which serves to synchronize and match streams ratio dosing flow with streams combining and mixing flow.

18. The method as set forth in claim 1 wherein the streams combining chamber may be closed to atmosphere and wherein a pressure sensor is provided, and wherein level control can be implemented by first establishing a defined gas pressure in the chamber between flow cycles, then closing the chamber prior to a synchronous streams ratio dose flow cycle, then measuring the chamber pressure during streams flow using a pressure sensor and using the pressure sensor measurement to give feedback loop control of the mix stage pump in order to hold the chamber pressure and thus level nearly constant such that falling pressure increases mix pump flow and increasing pressure reduces mix pump flow.

* * * * *